United States Patent
Inoue et al.

(10) Patent No.: US 9,479,734 B2
(45) Date of Patent: Oct. 25, 2016

(54) INFORMATION PROCESSING APPARATUS, CALLING METHOD, AND COMMUNICATION SYSTEM

(71) Applicants: Koichi Inoue, Kanagawa (JP);
Takahiro Asai, Kanagawa (JP);
Yoshikazu Goto, Kanagawa (JP)

(72) Inventors: Koichi Inoue, Kanagawa (JP);
Takahiro Asai, Kanagawa (JP);
Yoshikazu Goto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/924,942

(22) Filed: Oct. 28, 2015

(65) Prior Publication Data
US 2016/0127688 A1    May 5, 2016

(30) Foreign Application Priority Data

Oct. 30, 2014  (JP) ................................ 2014-221760

(51) Int. Cl.
*H04N 7/15*       (2006.01)
(52) U.S. Cl.
CPC .................... *H04N 7/152* (2013.01)
(58) Field of Classification Search
USPC ..................................................... 348/14.08
See application file for complete search history.

(56) References Cited

U.S. PATENT DOCUMENTS

| | | | |
|---|---|---|---|
| 8,861,377 B2 | 10/2014 | Okuyama et al. | |
| 2009/0319898 A1* | 12/2009 | Vitorino | H04M 1/2535 715/716 |
| 2011/0124375 A1* | 5/2011 | Stuivenwold | G06F 1/3203 455/566 |
| 2013/0027504 A1* | 1/2013 | Zhang | H04L 12/1827 348/14.08 |
| 2014/0176662 A1* | 6/2014 | Goodman | H04N 7/141 348/14.07 |
| 2014/0362741 A1 | 12/2014 | Okuyama et al. | |
| 2015/0017961 A1* | 1/2015 | Bennett | H04M 3/42221 455/417 |
| 2015/0056972 A1* | 2/2015 | Bartlett | H04M 1/72563 455/418 |
| 2016/0050311 A1* | 2/2016 | Goldstein | H04M 3/42051 455/566 |

FOREIGN PATENT DOCUMENTS

| | | |
|---|---|---|
| JP | H7-240775 | 9/1995 |
| JP | 2005-348185 | 12/2005 |
| JP | 2013-085208 | 5/2013 |

* cited by examiner

*Primary Examiner* — Creighton Smith
(74) *Attorney, Agent, or Firm* — Oblon, McClelland, Maier & Neustadt, L.L.P

(57) ABSTRACT

An information processing apparatus includes one or more processors configured to receive image data from another information processing apparatus. The processor includes a reception unit that receives call information from the other information processing apparatus when the processor is in a state of receiving at least the image data from the other information processing apparatus, and a calling sound output unit that outputs a calling sound upon reception of the call information by the reception unit.

9 Claims, 21 Drawing Sheets

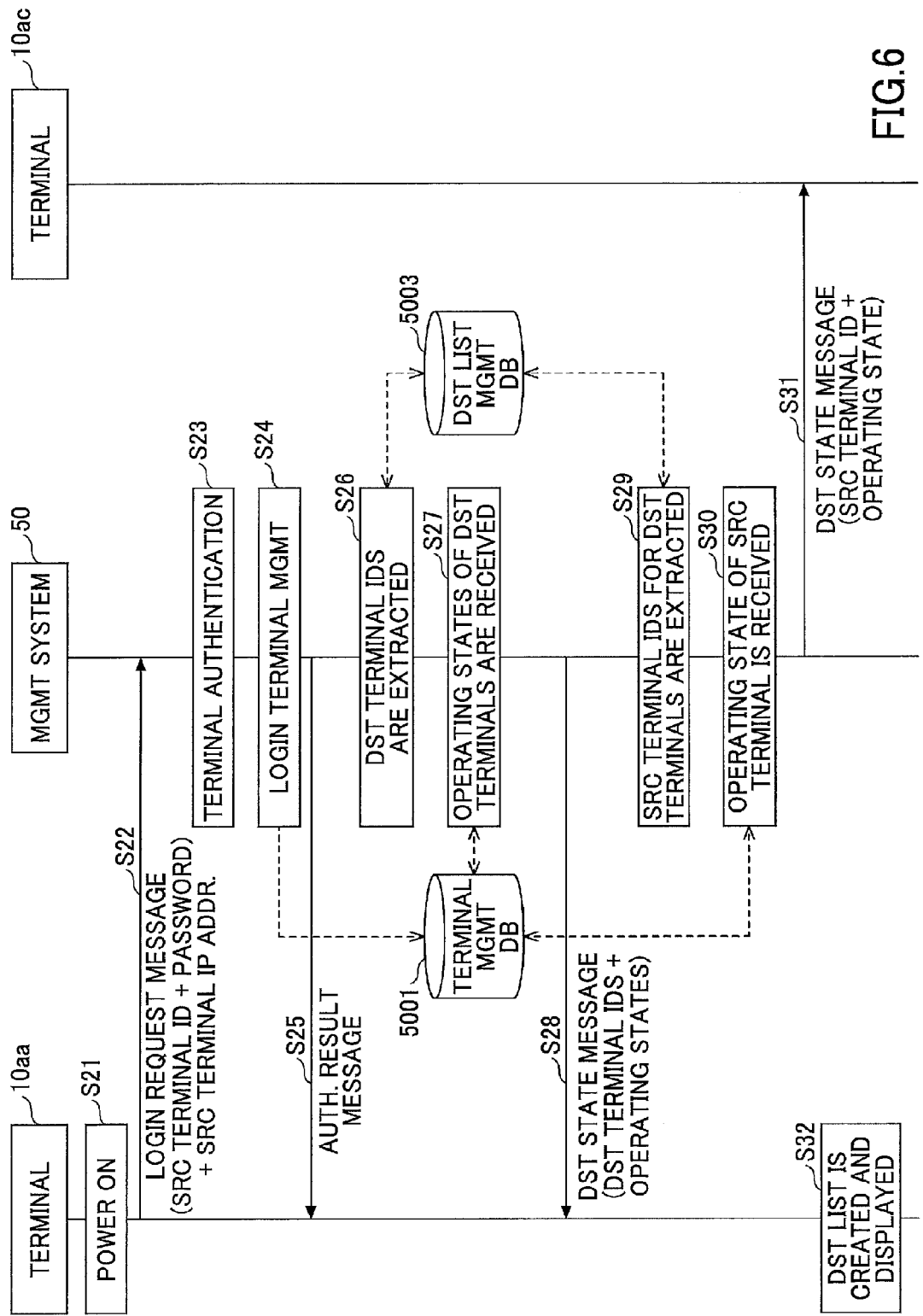

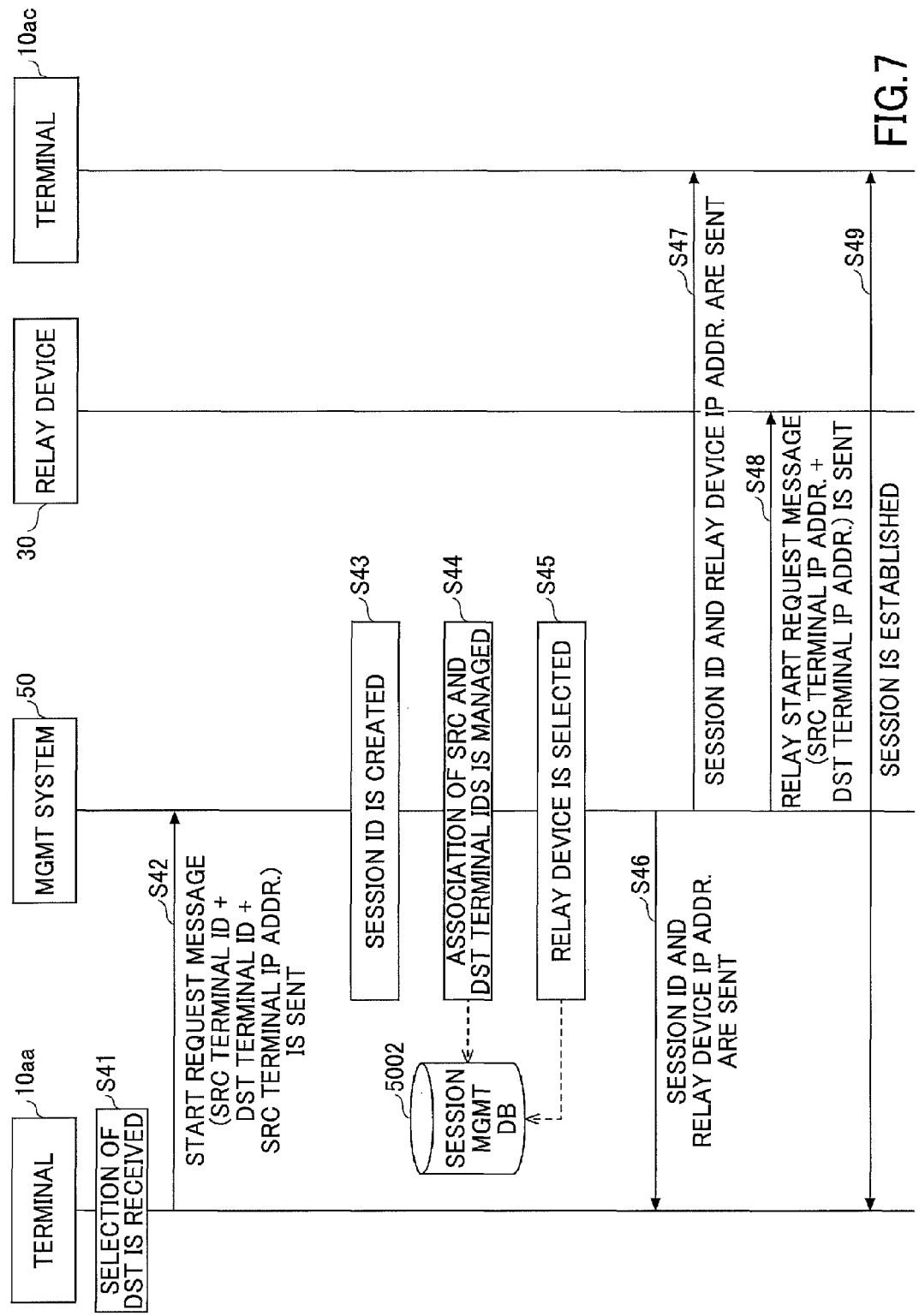

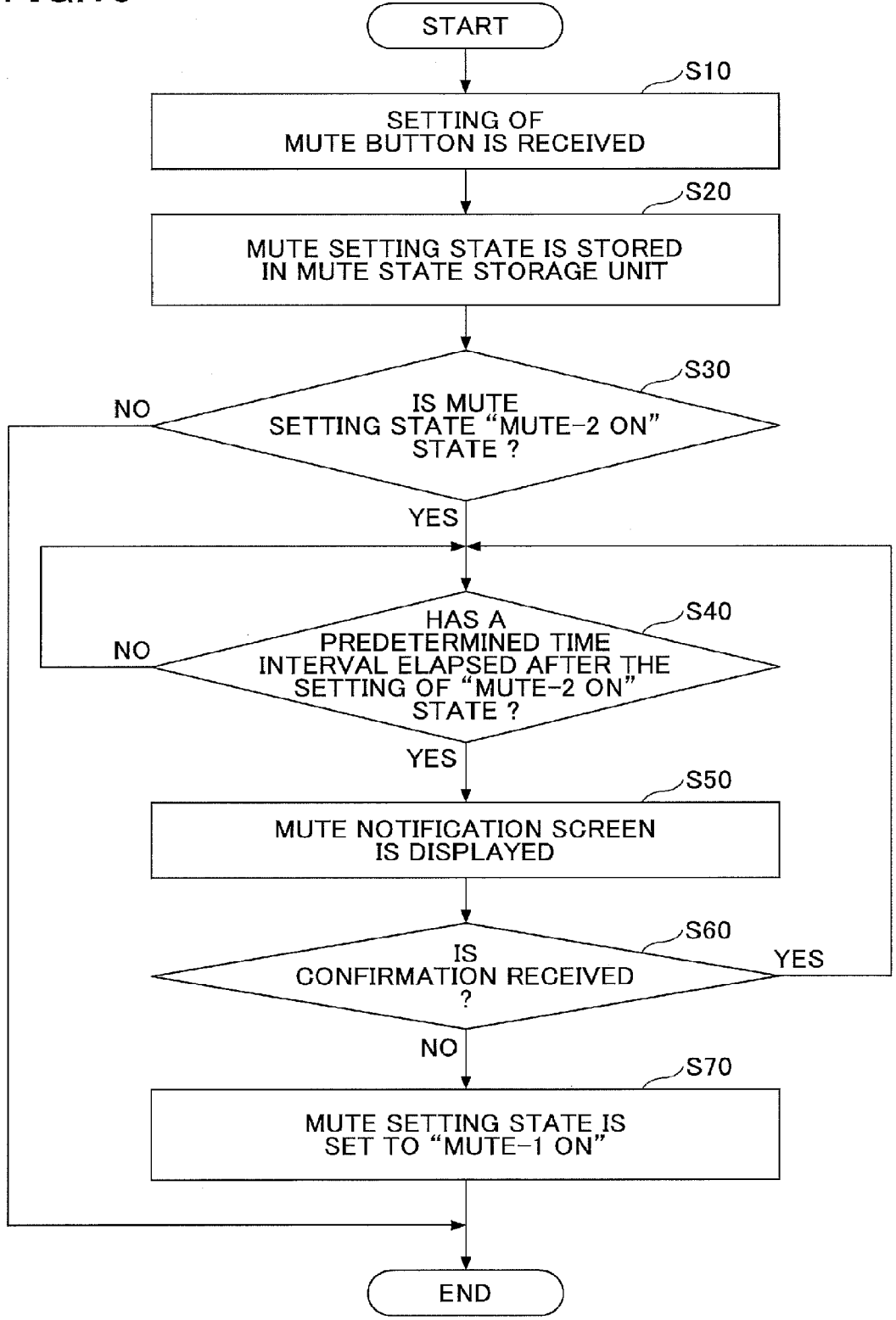

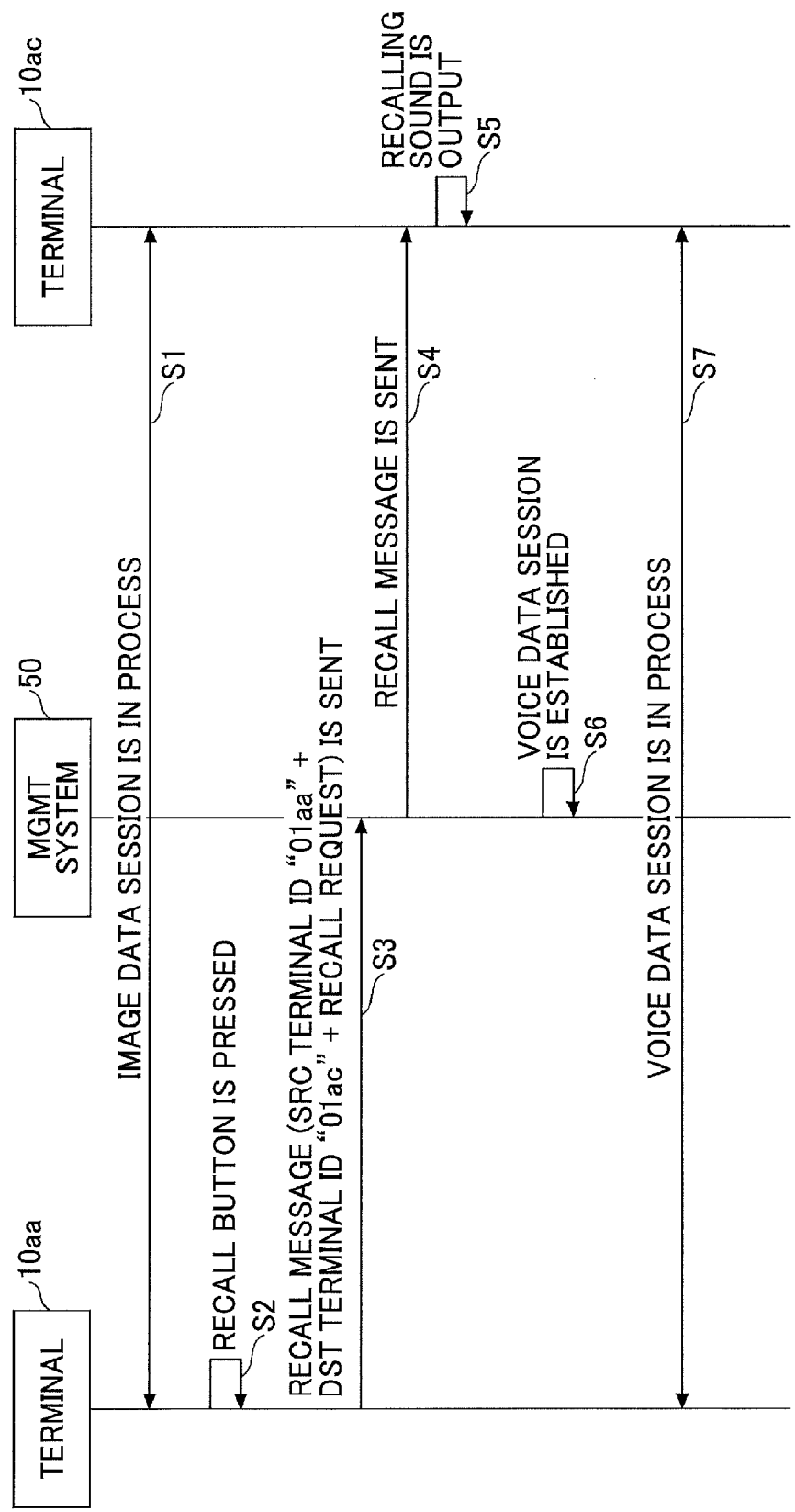

INFORMATION PROCESSING APPARATUS, CALLING METHOD, AND COMMUNICATION SYSTEM

BACKGROUND OF THE INVENTION

1. Field of the Invention

The present invention relates to an information processing apparatus, a calling method, and a communication system.

2. Description of the Related Art

A videoconference system is known as an example of a transmission system which is adapted to conduct a videoconference between two or more transmission terminals via a communication network, such as the Internet. In the videoconference system, a videoconference may be implemented by transmitting and receiving image data and voice data between the transmission terminals. A transmission terminal at a receiving end receives the image data and the voice data from a transmission terminal at a transmitting end, and an image of a user of the transmitting end is displayed on a display of the receiving terminal and voice sound of the user of the transmitting end is output by a speaker of the receiving terminal, so that the videoconference between the terminals is conducted.

In the videoconference system, while image data are continuously transmitted between the terminals, each of the terminals displays an image based on the image data received from other terminals in real time, and a user of each terminal may grasp the conditions of other locations where the other terminals are provided. Namely, a business operation may be carried out with a proper feeling of tension and a sense of togetherness because the users at different locations feel mutual presence via respective screens displayed on the terminals even when no conversation is exchanged between the users. Moreover, if the necessity arises and a user at a certain location starts conversation with another user at another location, it is possible to start a videoconference at any timing.

However, if the transmission system is configured so that each terminal continuously transmits image data even in the absence of conversation between the terminals, a first user of a first terminal may set the voice data from other terminals in a mute state or may set a volume control of the first terminal to a low level. In such cases, even if a second user of a second terminal intends to start conversation with the first user of the first terminal and calls out the first user loudly via the second terminal, the first user is likely to be unaware of the call from the second user.

To overcome the problem, it is proposed to send a request for starting conversation with the first user using a method other than the videoconferencing method from the second terminal to the first terminal. For example, see Japanese Laid-Open Patent Publication No. 2005-348185. Japanese Laid-Open Patent Publication No. 2005-348185 discloses a mobile terminal which is adapted to transmit an e-mail including content data to a mail address of a mobile terminal of a communication partner during a conversation with the communication partner.

However, it is required that the mobile terminal disclosed in Japanese Laid-Open Patent Publication No. 2005-348185 has an e-mail transmission/reception function as well as a call control function linked to a telephone line, and it is difficult to utilize such a mobile terminal technology for a transmission terminal having no such functions.

SUMMARY OF THE INVENTION

In one aspect, the present invention provides an information processing apparatus which is capable of recalling another information processing apparatus when communication between the information processing apparatuses is in process.

In an embodiment, the present invention provides an information processing apparatus including one or more processors configured to receive image data from another information processing apparatus, the processor including a reception unit configured to receive call information from the other information processing apparatus when the processor is in a state of receiving at least the image data from the other information processing apparatus, and a calling sound output unit configured to output a calling sound upon reception of the call information by the reception unit.

The object and advantages of the invention will be implemented and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a sequence diagram for explaining a preparatory process for starting communication between transmission terminals.

FIG. 7 is a sequence diagram for explaining a process for establishing a session between transmission terminals.

FIG. 15 is a flowchart for explaining a process in which a notification of a mute setting state of the transmission terminal is sent to a user of the transmission terminal.

FIG. 22 is a sequence diagram for explaining a process in which the transmission terminal recalls another transmission terminal.

DETAILED DESCRIPTION OF THE PREFERRED EMBODIMENTS

A description will be given of embodiments with reference to the accompanying drawings.

[Overall Configuration]

Figure 1:
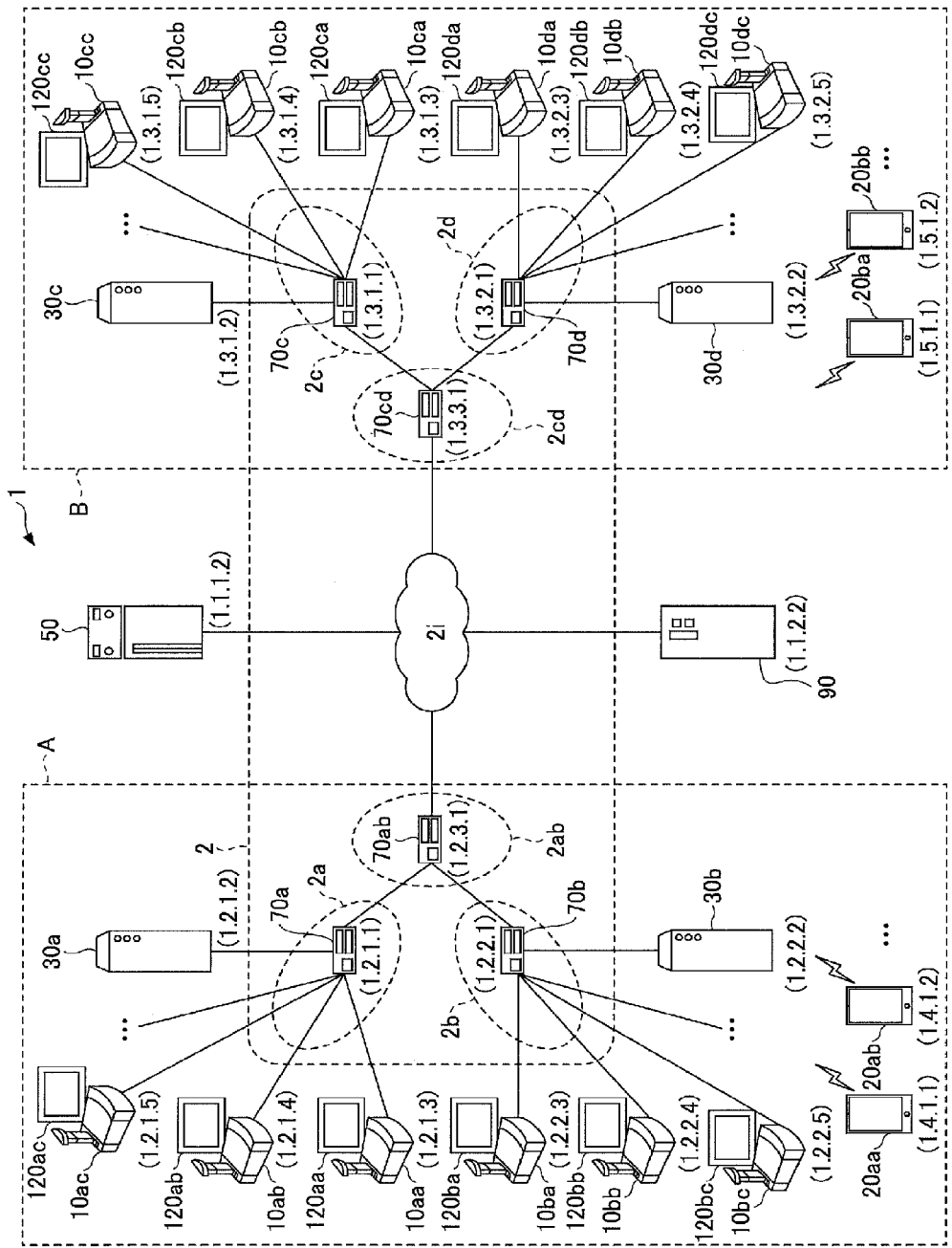
FIG. 1 is a schematic diagram of a transmission system as an example of a communication system according to the invention.

FIG. 1 is a schematic diagram of a transmission system 1 as an example of a communication system according to the invention. The transmission system 1 is a communication system in which information or emotional expressions are mutually communicated among two or more transmission terminals via a transmission management system 50. There are various types of transmission systems. Examples of the transmission systems include a videoconference system, a videophone system, an audio conference system, a voice-call system, a personal computer screen sharing system, a text chat system, etc. Moreover, another example of the transmission system 1 may be a data providing system in which content data are transmitted from one transmission terminal to another transmission terminal via the transmission management system 50 in one-way direction.

The following embodiments describe the transmission system 1 by conceptualizing the videoconference system as an example of the communication system.

As shown in FIG. 1, the transmission system 1 includes two or more transmission terminals (10aa, 10ab, ... ), two or more mobile terminals (20aa, 20ab, ... ), two or more displays (120aa, 120ab, ... ) for the respective transmission terminals (10aa, 10ab, ... ), two or more relay devices (30a, 30b, ... ), a transmission management system 50, and a program providing system 90.

Each of the transmission terminals 10 is configured to transmit and receive image data and voice data as an example of content data. Namely, each transmission terminal 10 is a videoconference terminal which is capable of using a videoconference service. Note that, in this embodiment, each transmission terminal 10 is a dedicated terminal for performing a videoconference.

Each of the mobile terminals 20 is configured to transmit and receive image data and voice data as an example of content data. Each mobile terminal 20 may be configured to transmit and receive text data. Namely, each mobile terminal 20 may be used not only for performing a videoconference, but may be also used for performing a text chat. Unless otherwise specified, each mobile terminal 20 in this embodiment is any one of a tablet terminal, a mobile phone, a smart phone, a personal digital assistant (PDA), a wearable PC, a game device, a general-purpose PC terminal, a car navigation terminal, a projection device such as a projector, and a general-purpose mobile terminal such as an electronic whiteboard. Note that the mobile terminals 20 are connected to the communication network 2 by wireless connection via a mobile communication network or Wi-Fi (Wireless Fidelity).

As is apparent from the hardware configuration described later, each of the transmission terminals 10 and the mobile terminals 20 may be called an information processing apparatus.

The transmission terminals 10 and the mobile terminals 20 are managed by the transmission management system 50, and the transmission management system 50 is configured to manage call control of the communication system.

Note that, in the following, any one of the transmission terminals (10aa, 10ab, ... ) may be called a transmission terminal 10, and any one of the mobile terminals (20aa, 20ab, ... ) may be called a mobile terminal 20. Moreover, any one of the displays (120aa, 120ab, ... ) may be called a display 120, and any one of the relay devices (30a, 30b, ... ) may be called a relay device 30. In addition, when a request for starting a videoconference is transmitted from one transmission terminal 10 or mobile terminal 20 to another transmission terminal 10 or mobile terminal 20, the transmission terminal 10 or the mobile terminal 20 on the transmission side may be called a source terminal, and the transmission terminal 10 or the mobile terminal 20 on the reception side may be called a destination terminal.

In the transmission system 1, a management data session between a source terminal and a destination terminal is established via the transmission management system 50 for transmitting and receiving various kinds of management data. Moreover, a content data session between a source terminal and a destination terminal is established via the relay device 30 for transmitting and receiving content data including image data and voice data. Note that the content data session does not necessarily require the mediation of the relay device 30 and may be established via the transmission management system 50. Alternatively, the content data session may be established directly by the source terminal and the destination terminal.

As described above, the relay device 30 is configured to relay the content data between the transmission terminals 10 and the mobile terminals 20. Note that there may be a case in which a session between the mobile terminal 20 and the transmission terminal 10 is established by the transmission terminal 10.

The transmission management system 50 is configured to perform login authentication, conversation-condition management and destination-list management of the transmission terminal 10 and the mobile terminal 20, and conversation-condition management of the relay device 30.

Routers (70a, 70b, 70c, 70d, 70ab, 70cd) are configured to select optimal paths for the content data. Note that, in the following, any one of the routers (70a, 70b, 70c, 70d, 70ab, 70cd) may be simply called a "router 70".

The program providing system 90 includes a not-illustrated hard disk (HD) configured to store a terminal program with which the transmission terminal 10 and the mobile terminal 20 may implement various functions and various methods. Hence, the program providing system 90 may transmit such terminal programs to the transmission terminal 10 or the mobile terminal 20. The HD of the program providing system 90 further stores a relay device program with which the relay device 30 may implement various functions and various methods. Hence, the program providing system 90 may transmit such relay device programs to the relay device 30. Further, the HD of the program providing system 90 further stores transmission management system programs, with which the transmission management system 50 may implement various functions and various methods. Hence, the program providing system 90 may transmit such transmission management system programs to the transmission management system 50.

The transmission terminals (10aa, 10ab, 10ac, . . . ), the relay device 30a, and the router 70a are connected via a LAN 2a so that they may communicate with one another. The transmission terminals (10ba, 10bb, 10bc, . . . ), the mobile terminals (20aa, 20ab, . . . ), the relay device 30b, and the router 70b are connected via a LAN 2b so that they may communicate with one another. As shown in FIG. 1, the LAN 2a and the LAN 2b are set up in a predetermined region A. In the region A, the LAN 2a and the LAN 2b are connected via a dedicated line tab including the router 70ab so that they may communicate with one another. For example, the region A may be Japan, the LAN 2a may be set up in a Tokyo office, and the LAN 2b may be set up in an Osaka office. Further, the mobile terminals (20aa, 20ab, . . . ) are used in the region A.

On the other hand, the transmission terminals (10ca, 10cb, 10cc, . . . ), the relay device 30c, and the router 70c are connected via a LAN 2c so that they may communicate with one another. The transmission terminals (10da, 10db, 10dc, . . . ), the mobile terminals (20ba, 20bb, . . . ), the relay device 30d, and the router 70d are connected via a LAN 2d so that they may communicate with one another. Moreover, the LAN 2c and the LAN 2d are set up in a predetermined region B. In the region B, the LAN 2c and the LAN 2d are connected via a dedicated line 2cd including the router 70cd so that they may communicate with one another. For example, the region B may be the United States of America, the LAN 2c may be set up in a New York office, and the LAN 2d may be set up in a Washington D.C. office. Further, the mobile terminals (20ba, 20bb, . . . ) are used in the region B.

The region A and the region B are connected from the respective routers 70ab and 70cd via the Internet 2i so that the region A and the region B are mutually in communication via the Internet 2i.

Note that the transmission terminal 10 may be directly connected to the Internet 2i, and does not necessarily require the connection via the dedicated line.

Furthermore, the transmission management system 50 and the program providing system 90 are connected to the transmission terminal 10, the mobile terminal 20, and the relay device 30 via the Internet 2i so that they may communicate with one another. The transmission management system 50 and the program providing system 90 may be installed in the region A or the region B, or may be installed in a region other than the regions A and B.

Note that, in this embodiment, the communication network 2 is made up of the LAN 2a, the LAN 2b, the dedicated line 2ab, the Internet 2i, the dedicated line 2cd, the LAN 2c, and the LAN 2d. In the communication network 2, the communication may be carried out via the wires, but may be partially carried out using the wireless communication protocols, such as Wi-Fi (Wireless Fidelity) or Bluetooth®.

In FIG. 1, the set of four numerals attached beneath or over each of the transmission terminal 10, the mobile transmission terminal 20, the relay device 30, the transmission management system 50, the router 70, and the program providing system 90 simply designates the IP address of the typical IPv4. For example, the IP address of the transmission terminal 10aa is "1.2.1.3", as shown in FIG. 1. The IP address may be the IPv6; however, in the present embodiment, the IPv4 is used for the sake of simplifying the illustration.

Note that, in the following, the transmission terminal may be simply called the "terminal" and the transmission management system may be simply called the "management system".

Each terminal 10 and each mobile terminal 20 may be used not only for communication between two or more offices or communication between different rooms in the same office, but may also be used for communication in the same room, communication between the outdoor locations, or communication between the indoor and outdoor locations. When each terminal 10 and each mobile terminal 20 are used outdoors, the wireless communication may be conducted via a mobile communication network.

[Hardware Configuration]

Figure 2:
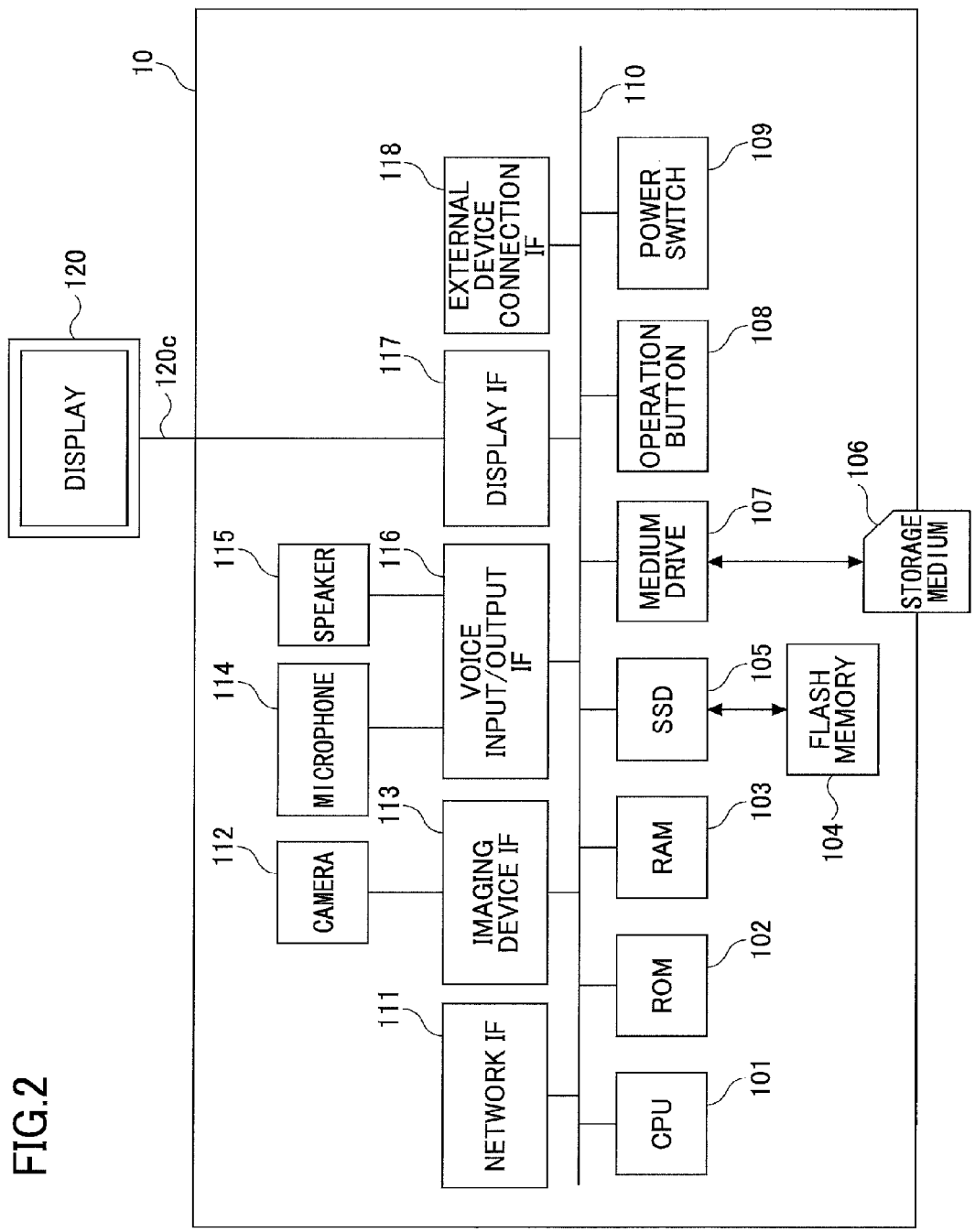
FIG. 2 is a block diagram showing a hardware configuration of a transmission terminal in the transmission system.

Next, a hardware configuration of the terminal 10 will be described with reference to FIG. 2. FIG. 2 shows a hardware configuration of the terminal 10. As shown in FIG. 2, the terminal 10 includes a central processing unit (CPU) 101 configured to control overall operations of the terminal 10, a read-only memory (ROM) 102 configured to store a program for driving the CPU 101 such as an initial program loader (IPL), a random access memory (RAM) 103 used as a work area of the CPU 101, a flash memory 104 configured to store the terminal programs and various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, a set of operation buttons 108 operated by a user for selecting an address of the terminal 10, a power switch 109 for switching ON/OFF the power of the terminal 10, and a network interface (IF) 111 for transmitting data utilizing the communication network 2.

The terminal 10 further includes a built-in camera 112 configured to image a subject based on the control of the CPU 101, an imaging device interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, an external device connection interface (IF) 118 configured to connect various external devices to the terminal 10, and a bus line 110 such as an address bus or a data bus for electrically connecting the elements and devices with one another as shown in FIG. 2 via the bus line 110.

The display 120 is a display unit formed of a liquid crystal or an organic EL material and configured to display images of the subject or icons for operating the terminal 10. Further, the display 120 is connected to the display IF 117 via a cable 120c. The cable 120c may be an analog RGB (VGA) cable, a component video cable, a high-definition multimedia interface (HDMI) cable or a digital video interface (DVI) cable.

The camera 112 includes lenses and a solid-state imaging device configured to convert light into electric charges to produce digital images (videos) of the subject. Examples of the solid-state imaging device include a complementary metal oxide semiconductor (CMOS) sensor and a charge coupled device (CCD) sensor.

The external device connection IF 118 may be connected via a universal serial bus (USB) cable with external devices, such as the external camera, the external microphone, and the external speaker. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the terminal 10 does not necessarily require the built-in camera 112, and only the external camera may be connected via the external device connection IF 118. Similarly, the terminal 10 does not necessarily require the built-in microphone 114 or the built-in speaker 115, and only the external microphone and the external speaker may be connected via the external device connection IF 118. Moreover, although the display 120 of the terminal 10 is connected to the display IF 117 by the cable 120c, the terminal 10 is not limited to this embodiment. Alternatively, the display 120 may be built in the terminal 10.

In addition, the terminal 10 may further include an external storage medium IF configured to read an external storage medium, such as a secure digital (SD) memory card or a subscriber identity module (SIM) card, in addition to the external device connection IF 118 described above.

Note that the storage medium 106 is removable from the terminal 10. In addition, if the storage medium 106 is a nonvolatile memory configured to retrieve or write data based on the control of the CPU 101, the storage medium 106 is not limited to the flash memory 104 and may be an electrically erasable and programmable ROM (EEPROM).

The above-described terminal program may be recorded as a file in an installable format or an executable format on a computer-readable recording medium such as the storage medium 106 to distribute the medium. The above-described terminal program may be recorded in the ROM 102 instead of being recorded in the flash memory 104.

[Mobile Terminal]

Figure 3:
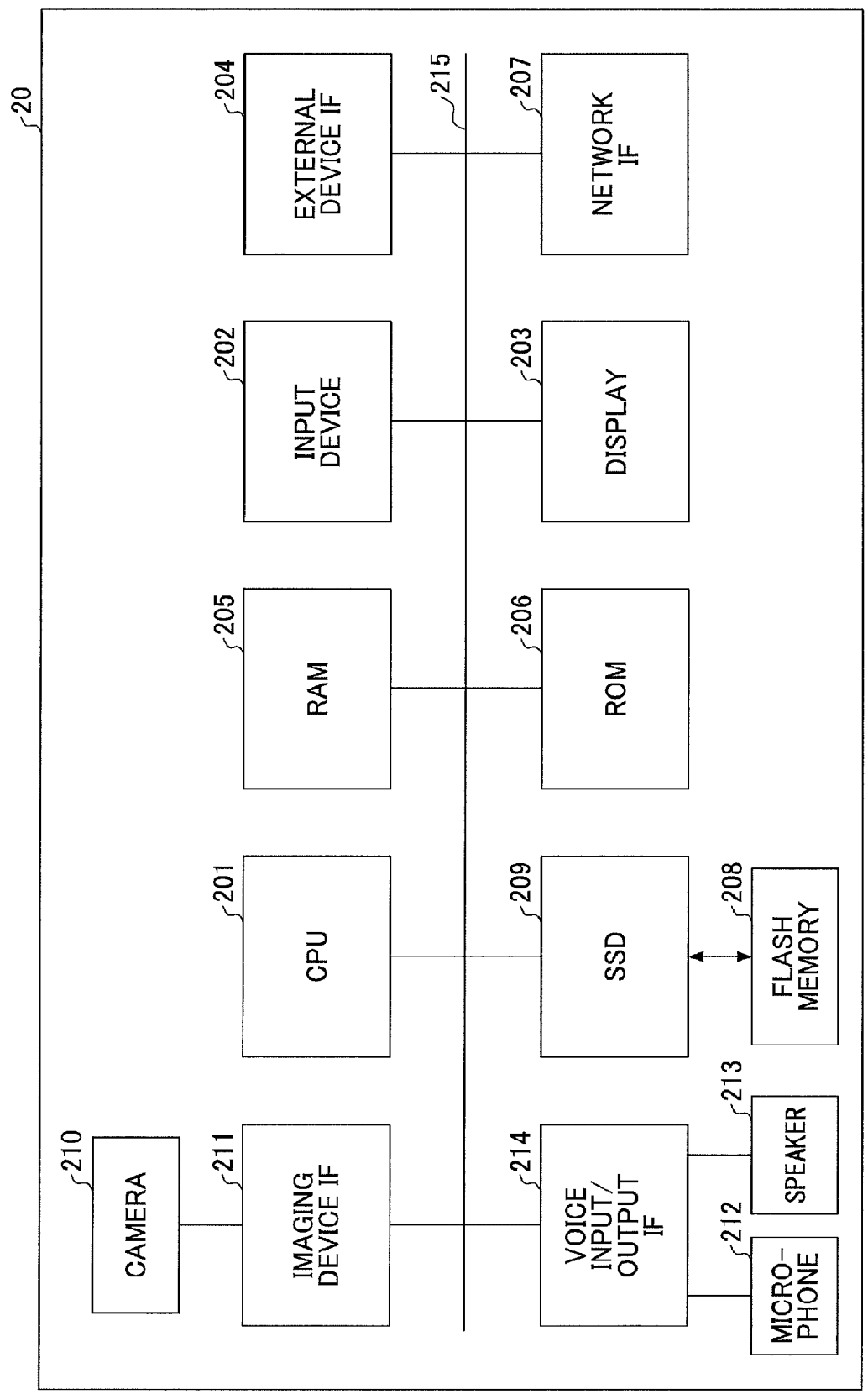
FIG. 3 is a block diagram showing a hardware configuration of a mobile terminal in the transmission system.

FIG. 3 is a block diagram showing a hardware configuration of a mobile terminal 20 in the transmission system 1. As shown in FIG. 3, the mobile terminal 20 includes a central processing unit (CPU) 201 configured to control overall operations of the mobile terminal 20, an input device 202 configured to input various operating signals to the mobile terminal 20, a display 203 configured to display the processing result by the mobile terminal 20, an external interface (IF) 204 for connecting various external devices, such as an external microphone, an external camera and an external storage medium (recording medium), to the mobile terminal 20, a random access memory (RAM) 205 used as a work area of the CPU 201, a read-only memory (ROM) 206 configured to store programs and data, such as OS settings and network settings of the mobile terminal 20, a network interface (IF) 207 configured to perform data transmission via a mobile communication network or the like, a flash memory 208 configured to store a mobile terminal program and various data, and a solid state drive (SSD) 209 configured to control writing of various data to and reading of the data from the flash memory 208 based on the control of the CPU 201.

The mobile terminal 20 further includes a built-in camera 210 configured to image a subject based on the control of the CPU 201, an imaging device interface (IF) 211 configured to control the driving of the camera 210, a built-in microphone 212 to input a voice signal, a built-in speaker 213 configured to output sound or voice according to the voice signal, a voice input/output interface (IF) 214 configured to process the input/output of the voice signal between the microphone 212 and the speaker 213 based on the control of the CPU 201, and a bus line 215, such as an address bus or a data bus, for electrically connecting the elements and devices with one another as shown in FIG. 3. Note that if the mobile terminal 20 is a terminal using a text chat service only, the camera 210, the microphone 212, and the speaker 213 may not be included in the mobile terminal 20.

If the storage medium included in the mobile terminal 20 is a nonvolatile memory configured to retrieve or write data based on the control of the CPU 201, the storage medium is not limited to the flash memory 208 and may be an electrically erasable and programmable ROM (EEPROM).

The above-described terminal program may be recorded as a file in an installable format or an executable format on a computer-readable recording medium such as the storage medium 106 to distribute the program. The above-described terminal program may be recorded in the ROM 206 instead of being recorded in the flash memory 206.

[Transmission Management System, Relay Device, Program Providing System]

Figure 4:
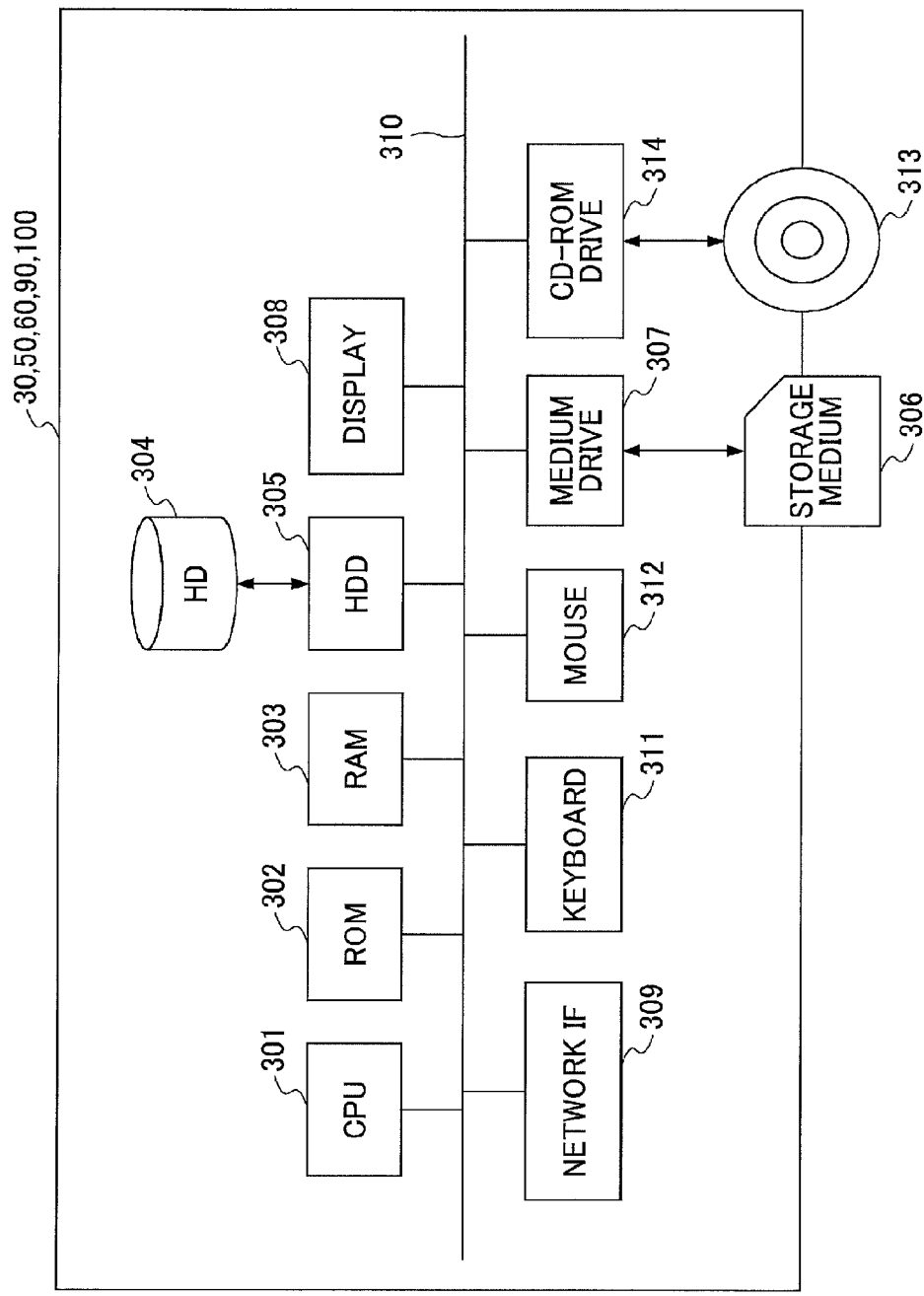
FIG. 4 is a block diagram showing a hardware configuration of a transmission management system, a relay device, and a program providing system.

Next, a hardware configuration of the management system 50, the relay device 30, and the program providing system 90 will be described with reference to FIG. 4. FIG. 4 is a block diagram showing a hardware configuration of the management system 50, the relay device 30, and the program providing system 90 in the transmission system 1.

As shown in FIG. 4, the management system 50 includes a central processing unit (CPU) 301 configured to control overall operations of the management system 50, a read-only memory (ROM) 302 configured to store a program for driving the CPU 301 such as an initial program loader (IPL), a random access memory (RAM) 303 used as a work area of the CPU 301, a hard disk (HD) 304 configured to store various data such as a management system program for controlling the management system 50, a hard disk drive (HDD) 305 configured to control retrieval and writing of the various data in the HD 304 based on the control of the CPU 301, a medium drive 307 configured to control retrieval and writing of data in a storage medium 306 such as a flash memory, a display 308 configured to display various information items such as a cursor, menus, windows, characters and images, a network interface (IF) 309 for transmitting data utilizing the communication network 2, a keyboard 311 including plural keys for inputting characters, numerals, and various instructions, a mouse 312 configured to select or execute various instructions, select items to be processed and move the cursor, a CD-ROM drive 314 configured to control retrieval of data in a compact disc read-only memory (CD-ROM) 313 as an example of the removable recording medium, and a bus line 310 such as an address bus or a data bus for electrically connecting the above-described elements and devices with one another via the bus line 310 as shown in FIG. 4.

Note that the above-described management system program may be recorded as a file in an installable format or in an executable format on a computer-readable recording medium such as the storage medium 306 or the CD-ROM 313 to distribute the program. Moreover, the above-described management system program may be stored in the ROM 302 instead of being recorded in the HD 304.

The relay device 30 and the program providing system 90 have a hardware configuration similar to that of the above-described management system 50, and a description of the hardware configuration of the relay device 30 and the program providing system 90 will be omitted. Note that the relay device program for controlling the relay device 30 may be recorded in the HD 304 of the relay device 30, and the program providing system program for controlling the program providing system 90 may be stored in the HD 304 of the program providing system 90. In this case, the relay device program and the program providing system program may be recorded as a file in an installable format or in an executable format on a computer-readable recording medium such as the storage medium 306 or the CD-ROM 313 to distribute the programs. The relay device program and the program providing system program may be recorded in the ROM 302 instead of being recorded in the HD 304.

Note that other examples of the removable recording medium include a compact disc recordable (CD-R), a digital versatile disk (DVD), and a Blu-ray disc (BD).

[Functional Configuration]

Figure 5:
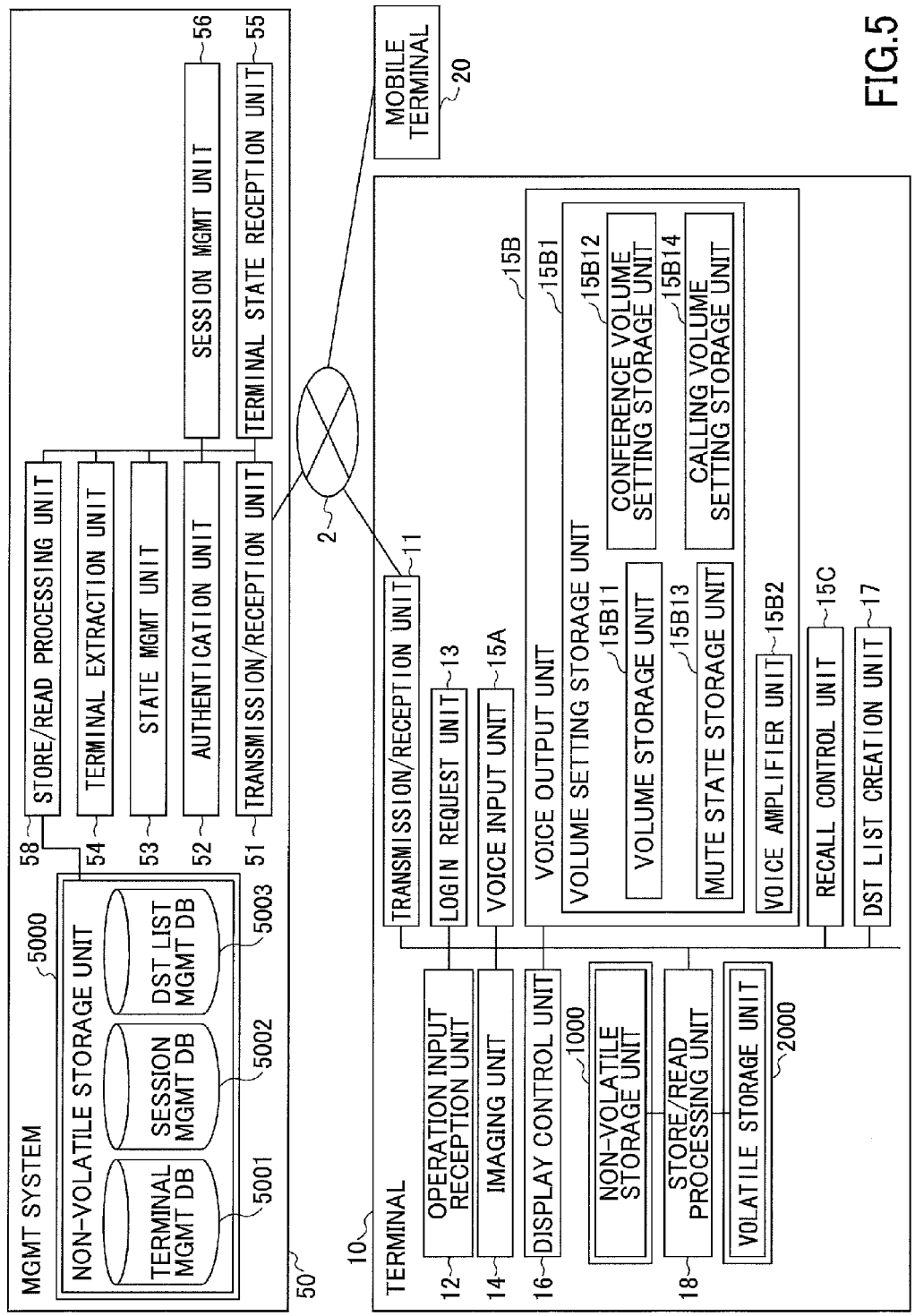
FIG. 5 is a block diagram showing a functional configuration of a transmission terminal, a mobile terminal, and a transmission management system which constitute the transmission system.

Next, a functional configuration of the transmission system 1 will be described with reference to FIG. 5. FIG. 5 is a block diagram showing a functional configuration of the terminal 10, the mobile terminal 20, and the management system 50 which constitute the transmission system 1.

In FIG. 5, the terminal 10, the mobile terminal 20, and the management system 50 are connected via the communication network 2 so that they may communicate with one another. Note that the program providing system 90 shown in FIG. 1 is not directly relevant to the present invention, and therefore the illustration of the program providing system 90 is omitted from FIG. 5. In addition, the mobile terminal 20 has a functional configuration that is essentially the same as that of the terminal 10, and the functions of the mobile terminal 20 will be described in association with those of the terminal 10.

Each of the terminal 10 and the mobile terminal 20 includes a transmission/reception unit 11, an operation input reception unit 12, a login request unit 13, an imaging unit 14, a voice input unit 15A, a voice output unit 15B, a recall control unit 15C, a display control unit 16, a destination list creation unit 17, and a store/read processing unit 18. In the following, unless otherwise specified, the functions of the terminal 10 shown in FIG. 5 will be described primarily.

These units of the terminal 10 represent functions and units implemented by any of the elements and devices shown in FIG. 2, which are activated by instructions from the CPU 101 based on the terminal program read from the flash memory 104 into the RAM 103.

Moreover, the terminal 10 includes a volatile storage unit 2000 which is formed of the RAM 103 shown in FIG. 2, and includes a nonvolatile storage unit 1000 which is formed of the flash memory 104 shown in FIG. 2.

The functional units of the terminal 10 will be described with reference to FIG. 2 and FIG. 5. The transmission/reception unit 11 of the terminal 10 shown in FIG. 5 is configured to transmit various data (or information) to and receive the data from other terminals, relay devices and systems via the communication network 2. The function of the transmission/reception unit 11 is implemented by instructions from the CPU 101 shown in FIG. 2 and the network IF 111 shown in FIG. 2. Before starting conversation with a desired destination terminal, the transmission/reception unit 11 starts receiving state information indicating a state of each of destination candidates from the management system 50. Note that the state information represents not only an operating state (an online or offline state) of the terminal 10 or the mobile terminal 20, but also a detailed state which indicates whether the terminal is under conversation or indicates whether the user is absent from the terminal even during an online state. However, in the following, the case in which the state information simply represents the operating state of the terminal will be described as an example.

Note that, in the foregoing, the transmission/reception unit 11 of the mobile terminal 20 starts receiving the state information which represents the state information of each of the destination candidates from the management system 50 before starting a conversation with a desired destination terminal.

The operation input reception unit 12 is configured to receive various inputs from a user, and this function of the operation input reception unit 12 is implemented by the operation buttons 108 and the power switch 109 shown in FIG. 2 and instructions from the CPU 101 shown in FIG. 2. The operation input reception unit 12 is an example of a selection reception unit. For example, when the user switches ON the power switch 109 shown in FIG. 2, the operation input reception unit 12 shown in FIG. 2 receives a power-ON signal to switch ON the power supply of the terminal 10. Note that, in the case of the mobile terminal 20, the function of the operation input reception unit 12 is implemented by instructions from the CPU 201 and the input device 202.

The login request unit 13 is configured to transmit, when the power-ON signal is received by the operation input reception unit 12, a login request message indicating a user's login request, information indicating a terminal type, and a current IP address of a request source terminal from the transmission/reception unit 11 to the management system 50 via the communication network 2. The function of the login request unit 13 is implemented by instructions from the CPU 101 shown in FIG. 2.

On the other hand, when the user switches OFF the power switch 109 from the ON state, the transmission/reception unit 11 transmits the state information indicating that the power supply is switched OFF, to the management system 50, and subsequently the operation input reception unit 12 switches OFF the power supply. Thereby, the management system 50 may grasp that the power supply of the terminal 10 is changed from the power-ON state to the power-OFF state.

In the case of the mobile terminal 20, the login request unit 13 is configured to transmit, when a login operation performed by the user of the mobile terminal 20 is received, a login request message indicating a user's login request, information indicating a terminal type of the request source terminal, and a current IP address of the request source terminal from the transmission/reception unit 11 to the management system 50 via the communication network 2. The function of the login request unit 13 is implemented by instructions from the CPU 201.

The imaging unit 14 is configured to take an image of a subject and output image data of the subject. The function of the imaging unit 14 is implemented by the camera 112 and the imaging device IF 113 shown in FIG. 2 and instructions from the CPU 101 shown in FIG. 2. Note that in the case of the mobile terminal 20, the imaging unit 14 is implemented by the camera 210 and the imaging device IF 211 shown in FIG. 3 and instructions from the CPU 201 shown in FIG. 3.

The voice input unit 15A is configured to input voice data of a voice signal obtained by the microphone 114 which converts a user's voice sound into the voice signal. The function of the voice input unit 15A is implemented by instructions from the CPU 101 shown in FIG. 2 and the voice input/output IF 116 shown in FIG. 2.

The voice output unit 15B is configured to output a voice signal according to the voice data to the speaker 115 so that the speaker 115 outputs sound according to the voice signal. The function of the voice output unit 15B is implemented by instructions from the CPU 101 shown in FIG. 2 and the voice input/output IF 116 shown in FIG. 2. Note that in the case of the mobile terminal 20, the voice input unit 15A and the voice output unit 15B are implemented by the voice input/output IF 214 shown in FIG. 3 and instructions from the CPU 201 shown in FIG.

The voice output unit 15B includes a volume setting storage unit 15B1 and a voice amplifier unit 15B2. The volume setting storage unit 15B1 includes a volume storage unit 15B11, a conference volume setting storage unit 15B12, a mute state storage unit 15B13, and a calling volume setting storage unit 15B14.

The voice amplifier unit 15B2 is configured to amplify the voice signal to be output from the voice output unit 15B. A volume of the sound according to the voice signal amplified by the voice amplifier unit 15B2 is stored in the volume storage unit 15B11. Further, in the volume storage unit 15B11, a volume of a calling sound stored in the calling volume setting storage unit 15B14 and a volume of a conference sound stored in the conference volume setting storage unit 15B12 are copied and stored. The volumes stored in these storage units are explained in detail as follows.

- The volume storage unit 15B11 is configured to store the current volume of the conference sounds transmitted from the terminals 10 or the mobile terminals 20 at the respective locations having participated in the video-conference, and the volume of the calling sound with which each terminal 10 outputs the calling sound.
- The conference volume setting storage unit 15B12 is configured to store the volume of the conference sound. A user may change the conference sound volume with a during-conference screen or a setting screen, or a physical button provided on the terminal.
- The calling volume setting storage unit 15B14 is configured to store the calling sound volume which is the volume of the calling sound. For example, this calling sound is a ringer tone produced at the time of establishment of a session (which will be described later). The volume of the calling sound includes a volume of a recalling sound. The volume of the calling sound is set up to be different from the volume of the conference sound. The calling sound volume is the volume of the calling sound output by the speakers 115 and 213. The calling sound volume may be the volume of a calling sound output from sound sources other than the speakers. A user may change the calling sound volume with a during-conference screen or a setting screen, or a physical button provided on the terminal.

The mute state storage unit 15B13 is configured to store the current state of a mute setting (which will be called a "mute setting state"). The mute setting state is indicated by one of the following three states:

(i) OFF state (mute setting is inactive);
(ii) mute-1 ON state (mute setting is active); and
(iii) mute-2 ON state (mute setting is active but recall setting is inactive).

The mute-1 ON state indicates that the terminal 10 is in a mute state but able to receive a recall request from another terminal. The mute-2 ON state indicates that the terminal 10 is in a mute state and unable to receive a recall request from another terminal. However, in the following, there may also be a case in which a mute state is described without specifying the mute-1 ON state or the mute-2 ON state.

Hence, only when the mute setting state is OFF, the voice amplifier unit 15B2 amplifies the voice signal and the voice output unit 15B outputs the amplified voice signal to the speaker 115.

The recall control unit 15C is configured to perform recall processing control. The function of the recall control unit 15C is implemented by instructions from the CPU 101 shown in FIG. 2. Specifically, in a state in which a content data session is established between two or more terminals, the recall control unit 15C of one of the terminals transmits a recall message to one or more other terminals 10 (or one or more other mobile terminals 20) which are selected by the user of the terminal. The recall message is an example of call information. The recall control unit 15C of the terminal 10 or the mobile terminal 20 which has received the recall message outputs a recalling sound unless the mute setting state is a mute-2 ON state (or when the mute setting state is an OFF state or a mute-1 ON state). Note that, in the case of the mobile terminal 20, the function of the recall control unit 15C is implemented by instructions from the CPU 201 shown in FIG. 3. The recalling sound may include a sound, a message, music, etc.

The display control unit 16 is configured to control transmission of image data to the external display 120. The function of the display control unit 16 is implemented by instructions from the CPU 101 shown in FIG. 2 and the display IF 117 shown in FIG. 2. Note that, in the case of the mobile terminal 20, the function of the display control unit 16 is implemented by instructions from the CPU 201 shown in FIG. 3 and the display 203 shown in FIG. 3, and the display control unit 16 is configured to control transmission of image data to the display 203.

The destination list creation unit 17 is configured to create and update a destination list based on the destination list information received from the management system 50 and the state information of the terminals 10 and the mobile terminals 20 as the destination candidates. The function of the destination list creation unit 17 is implemented by instructions from the CPU 101 shown in FIG. 2. Note that in the case of the mobile terminal 20, the function of the destination list creation unit 17 is implemented by instructions from the CPU 201 shown in FIG. 3.

The store/read processing unit 18 is configured to store various data in the nonvolatile storage unit 1000 or read various data from the nonvolatile storage unit 1000. The function of the store/read processing unit 18 is implemented by instructions from the CPU 101 shown in FIG. 2 and the SSD 105 shown in FIG. 2. In the nonvolatile storage unit 1000, a terminal ID (identification) and a password for identifying the terminal 10 as a destination terminal or for identifying a user of the terminal 10 are stored. Note that the terminal ID and the password may not be stored in the nonvolatile storage unit 1000. For example, the inputting of a terminal ID and a password of the user may be requested every time the user sends a login request to the management system 50.

The store/read processing unit 18 is further configured to store various data in the volatile storage unit 2000 or read various data from the volatile storage unit 2000. In the volatile storage unit 2000, image data and voice data which are received during a conversation with a destination terminal are overwritten every time they are received. Note that the display 120 displays previous image data before they are overwritten with new image data, and the speaker 115 outputs previous voice data before they are overwritten with new voice data. Note that, in the case of the mobile terminal 20, the function of the store/read processing unit 18 is implemented by instructions from the CPU 201 shown in FIG. 3 and the SSD 209 shown in FIG. 3.

Note that the terminal ID is identification information (such as language, characters, signs or various marks) for uniquely identifying the terminal 10 or the user who uses the terminal 10, and a relay device ID is identification information (such as language, characters, signs or various marks) for uniquely identifying the relay device 30. Moreover, the terminal ID and the relay device ID may be identification information which is described by at least two of language, characters, signs and various marks in combination.

Next, a functional configuration of the management system 50 will be described. As shown in FIG. 5, the management system 50 includes a transmission/reception unit 51, an authentication unit 52, a state management unit 53, a terminal extraction unit 54, a terminal state reception unit 55, a session management unit 56, and a store/read processing unit 58. These units of the management system 50 represent functions and units implemented by any of the elements and devices shown in FIG. 5, which are activated by instructions from the CPU 301 based on the management system program read from the HD 304 into the RAM 303. The management system 50 further includes a nonvolatile storage unit 5000 in which various data (or information) stored therein is maintained even after the power of the management system 50 is switched OFF, and the nonvolatile storage unit 5000 is formed of the HD 304 shown in FIG. 4.

[Session Management Table]

The nonvolatile storage unit 5000 includes a session management database 5002 which is formed of a session management table as shown in Table 1 below. In this session management table, session IDs used for execution of sessions for selecting the relay devices 30 are associated with relay device IDs identifying the relay devices 30 used for relaying the content data in the corresponding session, terminal IDs identifying respective request source terminals, and terminal IDs identifying respective destination terminals, and the associations of these IDs are managed.

TABLE 1

| SESSION ID | RELAY DEVICE ID | SOURCE TERMINAL ID | DESTINATION TERMINAL ID |
|---|---|---|---|
| se1 | 111a | 02aa | 01ac |
| se2 | 111b | 01ba | 01ca |

TABLE 1-continued

| SESSION ID | RELAY DEVICE ID | SOURCE TERMINAL ID | DESTINATION TERMINAL ID |
|---|---|---|---|
| se3 | 111d | 01bb | 01da |
| ... | ... | ... | ... |

[Destination List Management Table]

The nonvolatile storage unit 5000 includes a destination list management database 5003 which is formed of a destination list management table for managing destination list information as shown in Table 2 below. In the destination list management table, terminal IDs of request source terminals 10 which request a start of connection (call origination) for a videoconference are associated with lists of terminal IDs of destination terminals registered as destination candidates, and such destination list information is managed.

TABLE 2

| SOURCE TERMINAL ID | DESTINATION LIST |
|---|---|
| 01aa | 01ab, 01ac, ... |
| 01ab | 01aa, 01ac, ... |
| 01ac | 01aa, 01ab, ... |
| 01ba | 01bb, 01bc, ... |
| 01bb | 01ba, 01bc, ... |
| ... | ... |

[Terminal Management Table]

The nonvolatile storage unit 5000 includes a terminal management database 5001 which is formed of a terminal management table as shown in Table 3 below. In this terminal management table, terminal IDs of the terminals 10 or the mobile terminals 20 are associated with terminal names of the respective terminals when the corresponding terminal is selected as a destination terminal, operating states of the respective terminals, reception date/time at which a login request message is received from the management system 50 and the IP addresses of the respective terminals, and such terminal management information is managed.

TABLE 3

| TERMINAL ID | TERMINAL NAME | OPERATING STATE | RECEPTION DATE/TIME | IP ADDRESS |
|---|---|---|---|---|
| 01aa | AA TERMINAL | ONLINE (COMMUNICATION POSSIBLE) | 2013.11.10.13:40 | 1.2.1.3 |
| 01ab | AB TERMINAL | OFFLINE | 2013.11.09.12:00 | 1.2.1.4 |
| 01ac | AC TERMINAL | ONLINE | 2013.11.11.13:00 | 1.2.1.5 |
| 01ba | BA TERMINAL | ONLINE (IN COMMUNICATION) | 2013.11.10.13:45 | 1.2.2.3 |
| 01bb | BB TERMINAL | ONLINE | 2013.11.10.13:50 | 1.2.2.4 |
| ... | ... | ... | ... | ... |
| 02aa | AA MOBILE TERMINAL | ONLINE (COMMUNICATION POSSIBLE) | 2013.11.25.14:30 | 1.4.1.1 |
| 02ab | AB MOBILE TERMINAL | ONLINE (COMMUNICATION POSSIBLE) | 2013.11.25.14:29 | 1.4.1.2 |
| ... | ... | ... | ... | ... |
| 02ba | BA MOBILE TERMINAL | OFFLINE | 2013.11.24.13:30 | 1.5.1.1 |
| 02bb | BB MOBILE TERMINAL | ONLINE (COMMUNICATION POSSIBLE) | 2013.11.15.14:25 | 1.5.1.2 |
| ... | ... | ... | ... | ... |

Next, a functional configuration of the management system 50 will be described. The transmission/reception unit 51 is configured to transmit various data (information) to and receive such data from other terminals, relay devices and systems via the communication network 2, and such a function of the transmission/reception unit 51 is implemented by instructions from the CPU 301 shown in FIG. 4 and the network IF 309 shown in FIG. 4.

The authentication unit 52 is configured to authenticate the terminal 10 or the mobile terminal 20 based on whether a terminal ID and a password included in a login request massage received by the transmission/reception unit 51 are identical to those registered beforehand in the management system, and such a function of the authentication unit 52 is implemented by instructions from the CPU 301 shown in FIG. 4 and the network IF 309 shown in FIG. 4.

The state management unit 53 is configured to manage the terminal management table of the terminal management database 5001 by associating the terminal ID, the operating state, and the IP address of a request source terminal having sent a login request message, in order to manage the operating state of the request source terminal in the terminal management table, and such a function of the state management unit 53 is implemented by instructions from the CPU 301 shown in FIG. 4.

The terminal extraction unit 54 is configured to search for the terminal IDs of destination candidates connectable with the request source terminal in the destination list management table of the destination list management database 5003 by the terminal ID of the request source terminal having sent the login request message as a search key and obtain the terminal IDs of the destination candidates, and such a function of the terminal extraction unit 54 is implemented by instructions from the CPU 301 shown in FIG. 4.

The terminal state reception unit 55 is configured to receive the operating states of the terminals 10 as the destination candidates obtained by the terminal extraction unit 54, and such a function of the terminal state reception unit 55 is implemented by instructions from the CPU 301 shown in FIG. 4.

The session management unit 56 is configured to associate the session ID, the terminal ID of the request source terminal, the relay device ID of the relay device 30 which relays content data, and the terminal ID of the destination terminal and store and manage them in the session management table of the session management database 5002, and such a function of the session management unit 56 is implemented by instructions from the CPU 301 shown in FIG. 4.

The store/read processing unit 58 is configured to perform a process which stores various data in the nonvolatile storage unit 5000 and reads the stored data from the nonvolatile storage unit 5000, and such a function of the store/read processing unit 58 is implemented by instructions from the CPU 301 shown in FIG. 4 and the HDD 305 shown in FIG. 4.

[Processes and Operations]

Next, the processes and operations performed by the transmission system 1 will be described.

FIG. 6 is a sequence diagram for explaining a preparatory process for starting communication between the terminals 10.

In the preparatory process of FIG. 6, if the user of the terminal 10*aa* switches ON the power switch 109 shown in FIG. 2, the operation input reception unit 12 shown in FIG. 5 receives a power-ON signal from the power switch 109 and turns ON the power supply of the terminal 10*aa* (step S21). In response to the power-ON signal, the login request unit 13 transmits automatically a login request message indicating the user's login request from the transmission/reception unit 11 to the management system 50 via the communication network 2 (step S22). The login request message may be transmitted in arbitrary timing by a user's operation, not only at the time of receiving the power-ON signal. The login request message includes the terminal ID and the password for identifying the terminal 10*aa* as the request source terminal. Note that, when the login request message is transmitted from the terminal 10*aa* to the management system 50, the management system 50 at the receiving end may detect the IP address of the terminal 10*aa*. Note that when the mobile terminal 20 is a request source terminal, the operation input reception unit 12 receives a user's login operation, and transmits the terminal ID and the password to the management system 50.

Subsequently, the authentication unit 52 of the management system 50 performs a terminal authentication by determining whether the terminal ID and the password included in the login request message received via the transmission/reception unit 51 are consistent with a terminal ID and a password which are stored and managed in the management system (step S23). In the following, it is assumed that the authentication unit 52 determines that the login request received from the terminal 10*aa* has a valid access authorization.

When the authentication unit 52 determines the login request received from the terminal 10*aa* as having a valid access authorization, the state management unit 53 associates the terminal ID of the terminal 10*aa* with the operating state of the terminal 10*aa*, the reception date and time at which the login request message is received, and the IP address of the terminal 10*aa*, and stores them in the terminal management table (step S24).

The transmission/reception unit 51 of the management system 50 transmits an authentication result message indicating an authentication result obtained by the authentication unit 52 to the terminal 10*aa* as the login request source via the communication network 2 (step S25).

The terminal extraction unit 54 of the management system 50 searches for the destination list management table of the destination list management database 5003 by the terminal ID "01*aa*" of the terminal 10*aa* as the login request source as a search key, and extracts, from the destination list management table, terminal IDs of the terminals as destination candidates which may communicate with the terminal 10*aa* (step S26). For example, in the present case, the terminal IDs "01*ab*" and "01*ac*" of the destination terminals 10*ab* and 10*ac* corresponding to the terminal ID "01*aa*" of the terminal 10*aa* may be extracted.

Subsequently, the terminal state reception unit 55 searches for the terminal management table of the terminal management database 5001 by the terminal IDs ("01*ab*", "01*ac*") of the terminals 10*ab* and 10*ac* extracted by the terminal extraction unit 54 as a search key, and reads the operating states ("offline", "online") for the terminal IDs from the terminal management table (step S27).

Subsequently, the transmission/reception unit 51 transmits a destination state message, including the terminal IDs ("01*ab*", "01*ac*") extracted by the terminal extraction unit 54 and the operating states for the terminal IDs read by the terminal state reception unit 55, to the terminal 10*aa* via the communication network 2 (step S28). Thereby, the terminal 10*aa* may grasp the current operating states of the terminals (10*ab*, 10*ac*) which may communicate with the terminal 10*aa*.

Subsequently, the terminal extraction unit 54 of the management system 50 searches for the destination list management table of the destination list management database 5003 by the terminal ID "01aa" of the terminal 10aa that has requested for the login as a search key, and extracts terminal IDs of other request source terminals 10 that have been registered as the destination candidates for the terminal ID "01aa" (step S29). From the above-described destination list management table, the terminal IDs "01ab" and "01ac" of other terminals 10 are extracted.

Subsequently, the terminal state reception unit 55 of the management system 50 searches for the terminal management table of the terminal management database 5001 by the terminal ID "01aa" of the terminal 10aa which has requested for the login as a search key, and acquires the operating state of the terminal 10aa from the terminal management table (step S30).

Among the terminals (10ab, 10ac) corresponding to the terminal IDs (01ab, 01ac) extracted at the step S29, the transmission/reception unit 51 transmits a destination state message including the terminal ID ("01aa") and the operating state "online" of the request source terminal 10aa acquired at the step S30 to the terminal 10ac the operating state of which is presented as "online" in the terminal management table (step S31). Note that when the transmission/reception unit 51 transmits the destination state message to the terminal 10ac, the IP address of the terminal 10ac is acquired by making reference to the terminal management table by the terminal ID ("01ac") of the terminal 10ac.

After the destination list message and the operating states of the destination terminals as the destination candidates are received, the destination list creation unit 17 of the terminal 10aa creates a destination list and displays the destination list on the display 203 (step S32). In this case, the terminal name and the operating state (offline) of the terminal 10ab and the terminal name and the operating state (online) of the terminal 10ac included in the destination list are displayed.

On the other hand, other terminals 10 may grasp the operating states of the destination terminals 10 as the destination candidates by performing the same process as that of FIG. 6.

FIG. 7 is a sequence diagram for explaining a process for establishing a session between the terminals.

In the process of FIG. 7, if the user of the terminal 10aa selects the destination terminal of the terminal ID "01ac" displayed in the destination list using the operation buttons 108, the operation input reception unit 12 receives a request for starting connection (step S41).

The transmission/reception unit 11 of the terminal 10aa transmits a connection start request message including the terminal ID "01aa" of the source terminal 10aa and the terminal ID "01ac" of the destination terminal and indicating a request for starting connection to the management system 50 (step S42). With this connection start request message, the management system 50 may grasp the IP address of the request source terminal (the terminal 10aa).

Subsequently, the session management unit 56 of the management system 50 creates a session ID (step S43). This session ID is created so as not to overlap other session IDs.

Subsequently, the session management unit 56 of the management system 50 associates the created session ID with the terminal ID "01aa" of the request source terminal (the terminal 10aa) and the terminal ID "01ac" of the destination terminal (the terminal 10ac), and stores and manages them in the session management database 5002 (step S44).

Furthermore, the session management unit 56 of the management system 50 determines or selects a relay device 30 that is appropriate for communication between the request source terminal and the destination terminal (step S45). The method for determining the relay device 30 may be, for example, a method of selecting a relay device 30 which exists in a network with a widest communication band.

Note that a content data session may be directly established between the request source terminal and the destination terminal without selecting the relay device 30, or a content data session via the management system 50 may be established.

Subsequently, the transmission/reception unit 51 of the management system 50 transmits the session ID created at the step S43 and the IP address of the relay device 30 determined at the step S45 to the request source terminal (the terminal 10aa) and the destination terminal (the terminal 10ac) (steps S46 and S47).

Moreover, the transmission/reception unit 51 of the management system 50 transmits the IP address of the request source terminal (the terminal 10aa) and the IP address of the destination terminal (the terminal 10ac) to the relay device 30a (step S48).

Thereby, a content data session is established between the request source terminal (the terminal 10aa) and the destination terminal (terminal 10ac) (step S49). With the content data session being established, the terminal 10aa transmits image data and voice data to the terminal 10ac via the relay device 30, and the terminal 10ac transmits image data and voice data to the terminal 10aa via the relay device 30. In the timing of this step S49, the terminal 10ac outputs a calling sound (a ringer tone). Alternatively, the outputting of the calling sound may be made before or after the timing of the step S49.

Subsequently, the image data and the voice data are transmitted and received between the request source terminal (the terminal 10aa) and the destination terminal (the terminal 10ac) via the relay device 30 using the content data session established at the step S49.

[First Embodiment]

In this embodiment, the transmission system 1 is configured so that, when the mute setting state of the terminal 10 of the other-end location is set to a mute-1 ON state or an OFF state after the establishment of the content data session, a user of the terminal 10 of its own location is capable of recalling a user of the terminal 10 of the other-end location, which will be described.

Figure 8A:
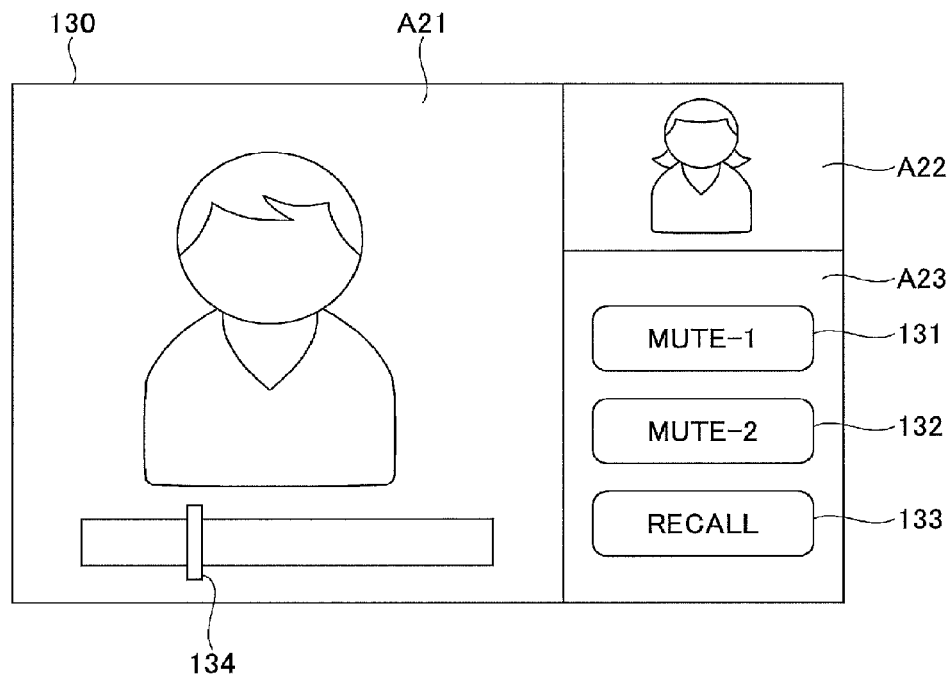
FIGS. 8A and 8B are diagrams showing examples of a conference screen displayed on a display.
Figure 8B:
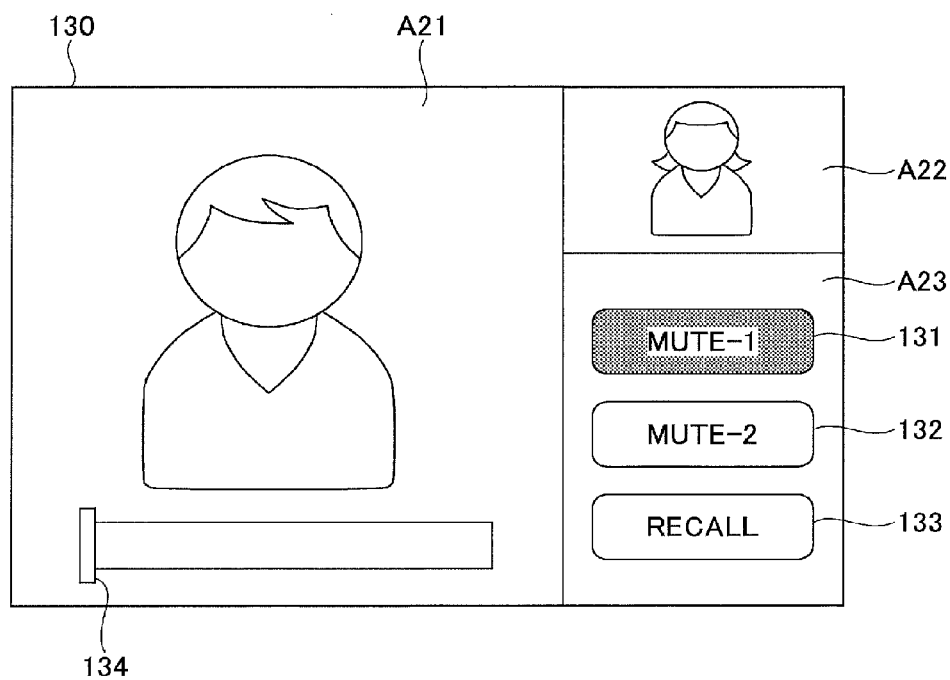

FIGS. 8A and 8B are diagrams showing examples of a conference screen 130 displayed on the display 120 during a conference. FIG. 8A shows an example of a conference screen 130 of a videoconference of the terminals 10 at two locations. The conference screen 130 shown in FIG. 8A is divided into three viewing areas A21 to A23. An image of the other-end party's location in the videoconference is displayed in the viewing area A21 which occupies the major portion of the conference screen 130. An image of its own location is displayed in the viewing area A22 at the upper left portion of the screen 130.

A volume control bar 134 for setting up a conference volume manually by the user is displayed in the viewing area A21, and the user may adjust the conference volume using this volume control bar 134. A mute-1 button 131, a mute-2 button 132, and a recall button 133 are displayed in the viewing area A23. The mute-1 button 131 is a button for setting up the mute-1 ON state as the mute setting state by the user. The mute-2 button 132 is a button for setting up the mute-2 ON state as the mute setting state by the user. The recall button 133 is a button for performing a recall process to the terminal 10 of the other-end location in the videoconference by the user of the terminal 10 of its own location.

Figure 9:
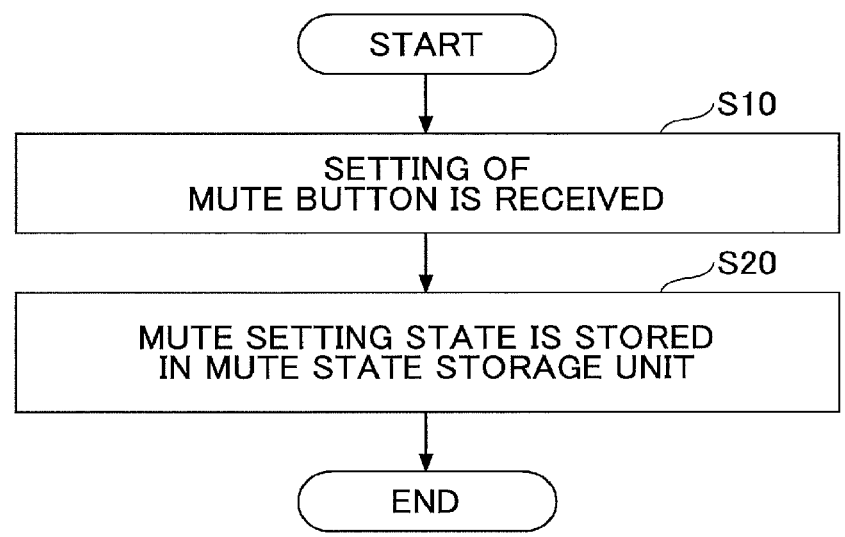
FIG. 9 is a flowchart for explaining a mute setting process performed by the transmission terminal when a mute button is pressed by a user of the transmission terminal.

FIG. 9 is a flowchart for explaining a mute setting process performed by the terminal 10 when a mute button is pressed by the user of the terminal 10.

In the process of FIG. 9, if the mute-1 button 131 shown in FIG. 8A is pressed by the user or selected using the mouse, the operation input reception unit 12 receives the setting of the mute-1 button 131 and sends a notification of the setting of the mute-1 button 131 to the voice output unit 15B (S10).

The voice output unit 15B stores a mute-1 ON state in the mute state storage unit 15B13 as the mute setting state (S20). Note that if the mute-2 button 132 is pressed by the user, a mute-2 ON state is stored in the mute state storage unit 15B13 as the mute setting state.

Thereby, the voice amplifier unit 15B2 does not perform the amplification of the volume by making reference to the stored mute setting state, and no sound is output from the speaker 115.

Note that the conference volume may be stored in the volume storage unit 15B11. Because the mute setting state is the mute-1 ON state or the mute-2 ON state, no sound is output from the speaker 115. A zero volume indicating a volume at the time of silence may be stored in the volume storage unit 15B11.

As shown in FIG. 8B, the mute-1 button 131 pressed by the user is highlighted in the conference screen 130, and the user is notified that the mute setting state is set to the mute-1 ON state. The present embodiment is not limited to the highlighting indication. Alternatively, the display control unit 16 may change the display indication of the mute-1 button 131 to a different display indication of the mute-1 ON state, by which the user is notified that the mute setting state is set to the mute-1 ON state. When the mute setting state is set to the mute-1 ON state, a display indication of the volume control bar 134 may be changed to the zero volume indicating the volume at the time of silence.

The mute-1 button 131 and the mute-2 button 132 as shown in FIGS. 8A and 8B are typical examples. Alternatively, a single mute button may be displayed in the conference screen 130, and every time the mute button is pressed by the user, the mute setting state may be changed cyclically to one of the mute-1 ON state, the mute-2 ON state and the OFF state in this order. Moreover, the mute-1 button 131 and the mute-2 button 132 may be implemented by hard keys instead of the soft keys as shown in FIGS. 8A and 8B.

[Recall in Mute State]

A recall process which is performed by the user of the terminal 10 of its own location to recall a user of the terminal 10 of the other-end location in the videoconference when the terminal 10 of the other-end location is in a mute state (a mute-1 ON state or a mute-2 ON state) will be described. The term "recall" is used because a calling sound is first output at the time of establishment of a content data session, and thereafter a calling sound is output at the second or subsequent timing during the recall process.

It is assumed that the terminal 10ac of the other-end location in the videoconference is currently in a mute-1 ON state or a mute-2 ON state, and the terminal 10aa of its own location recalls the terminal 10ac.

Figure 10:
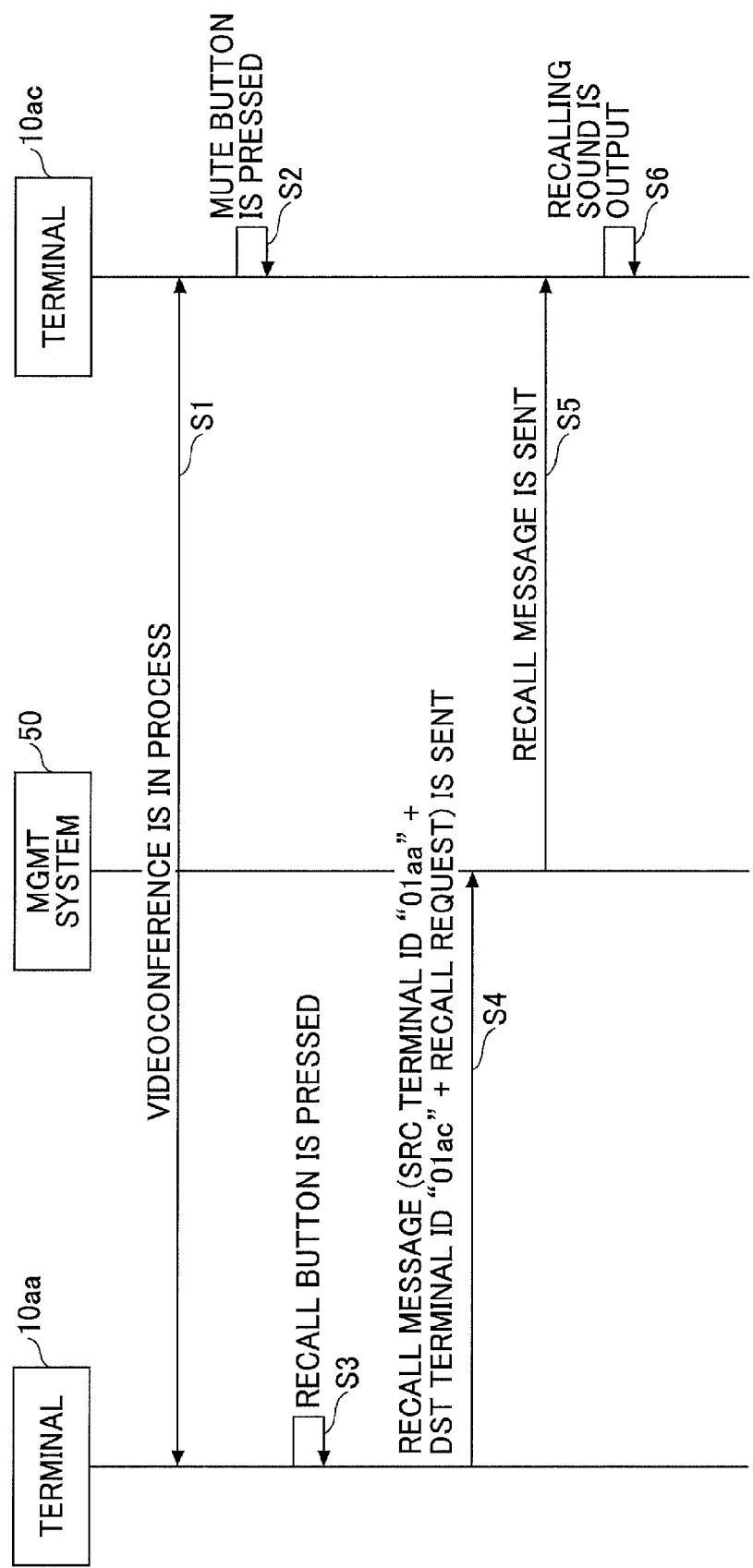
FIG. 10 is a sequence diagram for explaining a process in which the transmission terminal recalls another transmission terminal.

FIG. 10 is a sequence diagram for explaining a process in which the terminal 10aa recalls the terminal 10ac.

S1: A videoconference between the terminal 10aa and the terminal 10ac is in process. Namely, a content data session is already established between the terminals 10aa and 10ac, and content data including image data and voice data are transmitted and received between the terminals 10aa and 10ac.

S2: The user of the terminal 10ac presses, for example, the mute-1 button 131 and the mute setting state of the terminal 10ac is set to a mute-1 ON state. Note that in a case of the terminal 10 which is automatically set in a mute state after establishment of a content data session even if a user does not operate the terminal 10 (automatically set in a mute-1 ON state after establishment of a content data session so that no sound may be output), the operation by the user of the terminal 10ac at step S2 may be unnecessary.

S3: The user of the terminal 10aa presses the recall button 133.

S4: The operation input reception unit 12 of the terminal 10aa receives the depression of the recall button 133, and sends a notification of the depression of the recall button 133 to the recall control unit 15C. Hence, the recall control unit 15C transmits a recall message which is addressed to the terminal 10ac to the management system 50. Note that the recall message includes the terminal ID ("01aa") of the calling source terminal, the terminal ID ("01ac") of the destination terminal, and the recall request.

S5: The transmission/reception unit 51 of the management system 50 receives the recall message from the terminal 10aa and transmits the recall message to the terminal 10ac.

S6: The transmission/reception unit 11 of the terminal 10ac receives the recall message from the management system 50, and the recall control unit 15C of the terminal 10ac outputs a recalling sound if the mute setting state is not in a mute-2 ON state.

Figure 11:
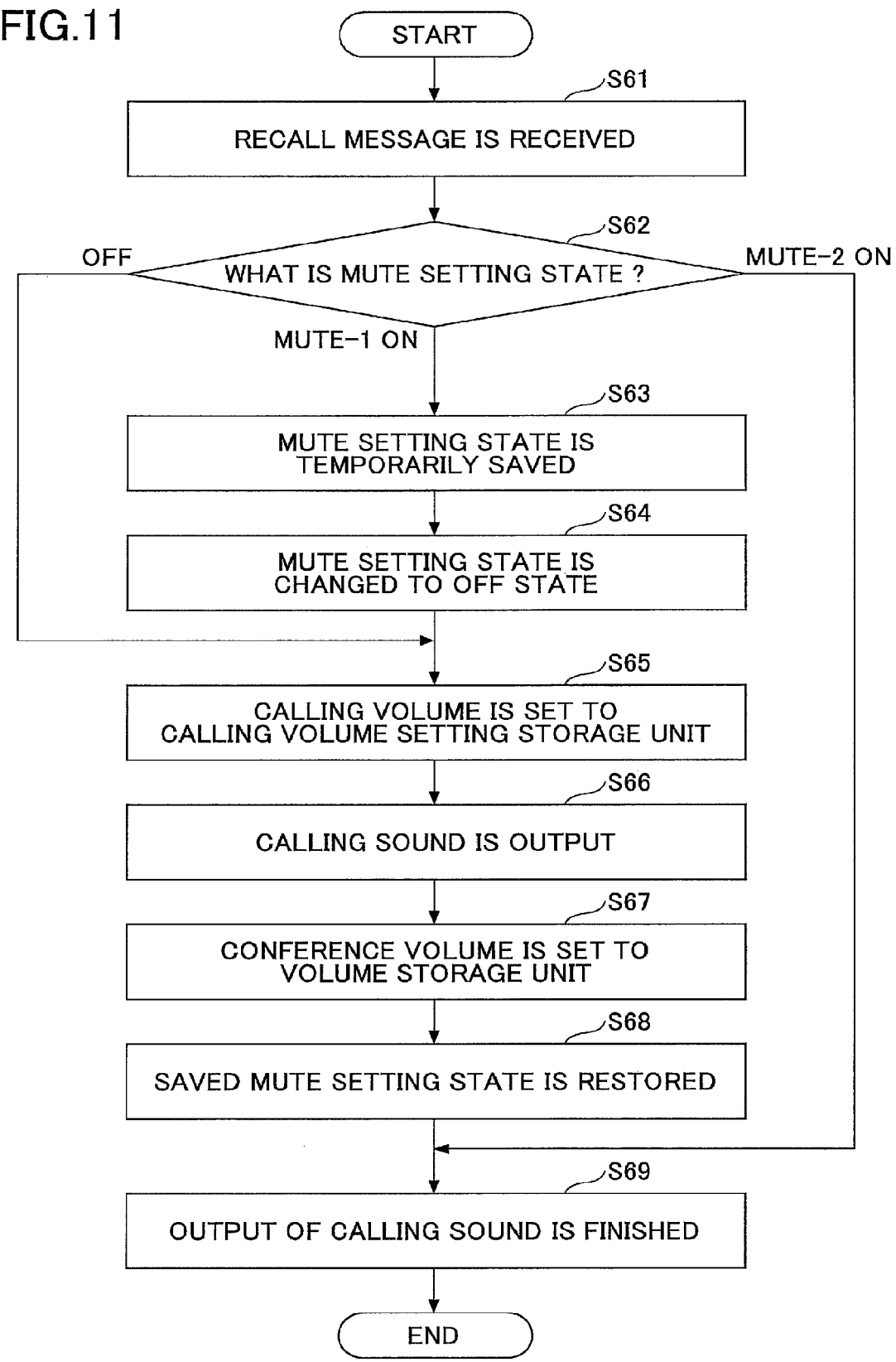
FIG. 11 is a flowchart for explaining a process in which a recall control unit of the transmission terminal outputs a recalling sound.

The outputting of the recalling sound at the step S6 will be described with reference to FIG. 11. FIG. 11 is a flowchart for explaining a process in which the recall control unit 15C of the terminal 10ac outputs the recalling sound.

In the process of FIG. 11, the transmission/reception unit 11 of the terminal 10ac receives a recall message (S61). The transmission/reception unit 11 of the terminal 10ac sends a notification of the received recall message to the recall control unit 15C.

The recall control unit 15C of the terminal 10ac checks the mute setting state of the terminal 10ac (an OFF state, a mute-1 ON state, or a mute-2 ON state) by making reference to the mute state storage unit 15B13 (S62).

When the mute setting state is a mute-2 ON state, the recall control unit 15C is unable to receive the recall request from the terminal 10aa, and the process is transferred to step S69. When the mute setting state is the mute-2 ON state, a recalling operation without outputting sound, such as blinking of the display 120ac, may be performed.

When the mute setting state is an OFF state, what is necessary is just to output a recalling sound, and the process is transferred to step S65.

When the mute setting state is a mute-1 ON state, the recall control unit 15C temporarily saves the mute setting state of the mute state storage unit 15B13 (S63). Namely, the information that the mute setting state is the mute-1 ON state is temporarily saved.

Subsequently, the recall control unit 15C changes the mute setting state of the mute state storage unit 15B13 into an OFF state (S64).

Subsequently, the recall control unit 15C sets the calling sound volume stored by the calling volume setting storage unit 15B14 to the volume storage unit 15B11 (S65). Namely, the volume storage unit 15B11 is set up so that a calling sound with the predetermined calling sound volume may be output from the speaker 115.

Subsequently, the recall control unit 15C requests the voice output unit 15B to output a recalling sound. Hence, the voice amplifier unit 15B2 amplifies the recalling sound with the volume of the volume storage unit 15B11, and the voice output unit 15B outputs the recalling sound from the speaker 115 (S66).

The recalling sound may be identical with the calling sound, or may be different from the calling sound. The display control unit 16 may display an image and a terminal name of the terminal 10aa from which the recall message is received on the display 120ac concurrent with the outputting of the recalling sound. Moreover, a recalling operation without outputting sound, such as blinking of the display 120ac by the display control unit 16, or vibrating of the terminal 10ac by driving a vibrator motor (not shown), may be performed in order to notify the user of the recalling request.

Note that a time for continuously outputting the recalling sound is predetermined, and the recall control unit 15C of the terminal 10ac may stop outputting the recalling sound when the user of the terminal 10ac performs a certain manual operation (cancellation of the mute state or depression of an arbitrary key). Moreover, the volume of the recalling sound may be gradually increased until the user performs such an operation.

After the outputting of the recalling sound is stopped, the recall control unit 15C sets the conference volume stored by the conference volume setting storage unit 15B12 to the volume storage unit 15B11 (S67).

Subsequently, the recall control unit 15C restores the saved mute setting state to the mute state storage unit 15B13 (S68).

Hence, the voice output unit 15B finishes the outputting of the recalling sound (S69).

Thereafter, when the recalling sound is recognized, the user of the terminal 10ac may operate the mute-1 button 131 and start communicating with the user of the terminal 10aa if the videoconference may be restarted.

When the mute setting state is set to the mute-1 ON state, the outputting of the recalling sound is allowed, and the recall control unit 15C may set the mute setting state to the OFF state even if the user's operation is not received.

As described above, according to the transmission system 1 of this embodiment, when the mute setting state of the terminal 10 of the other-end location in the videoconference is in an ON state, the user of the terminal 10 of its own location may recall the user of the terminal 10 of the other-end location. Even when the mute setting state of the terminal 10 of the other-end location is in an OFF state but the conference volume thereof is set to a low level or nearly zero, the user of the terminal 10 of its own location may request the terminal 10 of the other-end location to output a recalling sound with the calling sound volume regardless of the setting of the conference volume.

[Modifications]

Next, some modifications of the recall process will be described.

Figure 12:
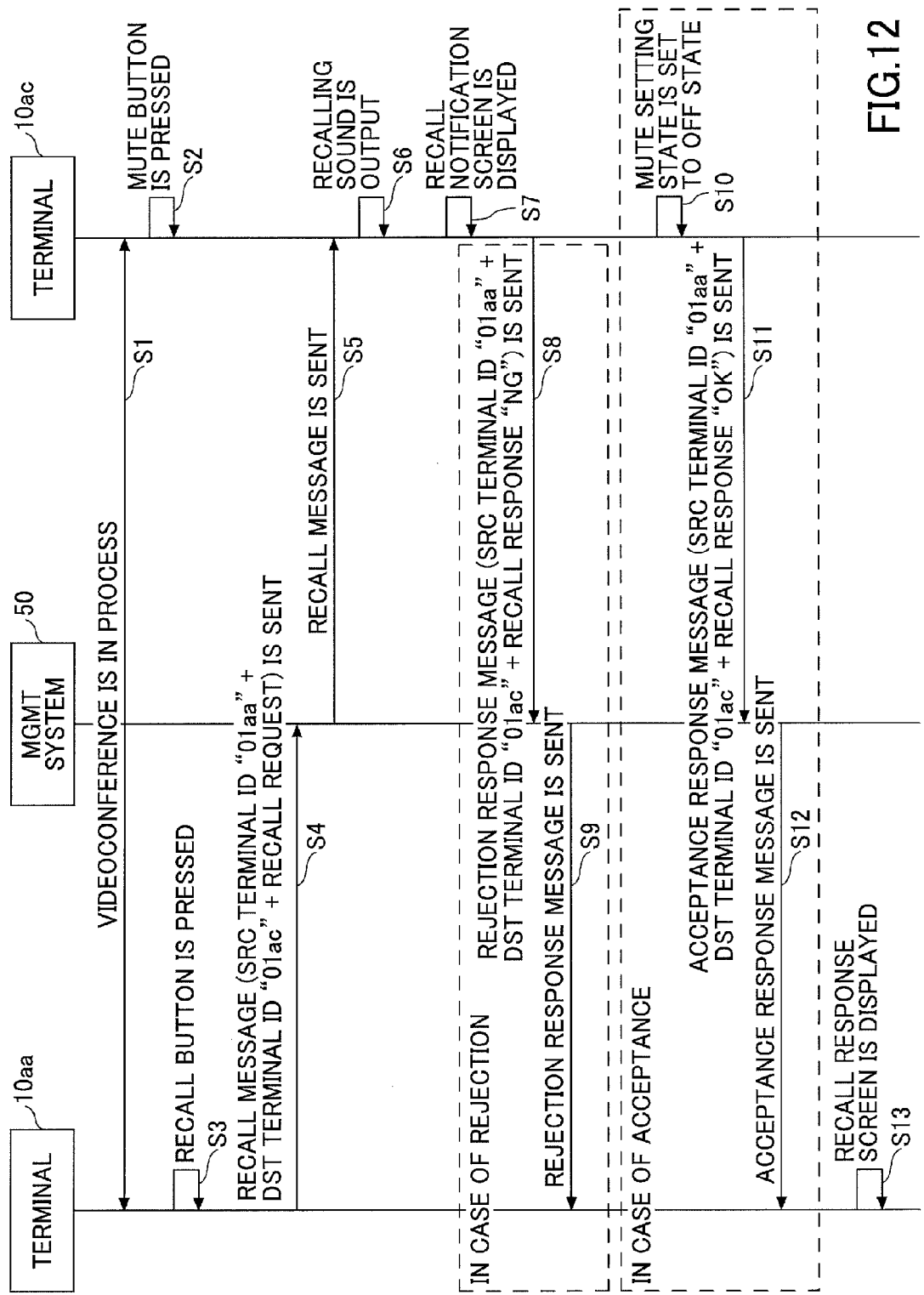
FIG. 12 is a sequence diagram for explaining a process in which the transmission terminal recalls another transmission terminal.

FIG. 12 is a sequence diagram for explaining a process in which the terminal 10aa recalls the terminal 10ac. In the process of FIG. 12, steps S1-S6 are the same as corresponding steps in the process of FIG. 10, and a description thereof will be omitted. Note that the sequence diagram of FIG. 12 differs from that of FIG. 10 in that the terminal 10ac displays a recall notification screen.

S7: The display control unit 16 of the terminal 10ac displays a recall notification screen concurrent with or after the outputting of a recalling sound by the recall control unit 15C. In a case in which the mute setting state is a mute-2 ON state, if the recall is notified to the user of the terminal 10ac by the highlighting of the display 120ac or the vibration of the terminal 10ac, the recall notification screen may not be displayed at step S7. Alternatively, in the case in which the mute setting state is a mute-2 ON state, the recall notification screen may be displayed according to the user's setting.

Figure 13:
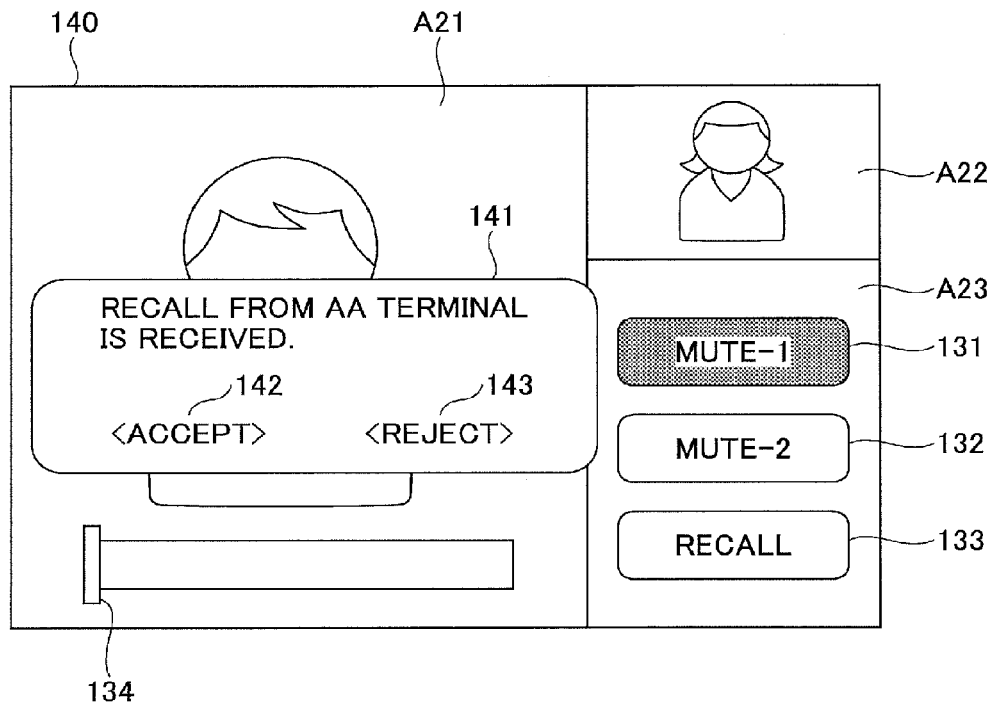
FIG. 13 is a diagram showing an example of a recall notification screen.

FIG. 13 is a diagram showing an example of a recall notification screen 140. A message 141 indicating that "recall from AA terminal is received", an ACCEPT button 142, and a REJECT button 143 are displayed in the recall notification screen 140. The ACCEPT button 142 is a button for the user of the terminal 10ac to transfer the intention of accepting the recall request and restarting the videoconference. The REJECT button 143 is a button for the user of the terminal 10ac to signal that the user has no intention of accepting the recall request and restarting the videoconference. The user of the terminal 10ac presses either the ACCEPT button 142 or the REJECT button 143 in the recall notification screen 140.

When the ACCEPT button 142 is pressed, the operation input reception unit 12 receives the depression of the ACCEPT button 142 and sends a notification of the depression of the ACCEPT button 142 to the voice output unit 15B. The voice output unit 15B sets the mute setting state to an OFF state if the mute-1 ON state is stored in the mute state storage unit 15B13. Hence, in this case, it is not necessary for the user of the terminal 10ac to press the mute-1 button 131 in order to set the mute setting state to an OFF state.

When the REJECT button 143 is pressed, the operation input reception unit 12 receives depression of the REJECT button 143. In this case, the mute setting state remains unchanged (a mute-1 ON state or an OFF state).

Figure 14A:
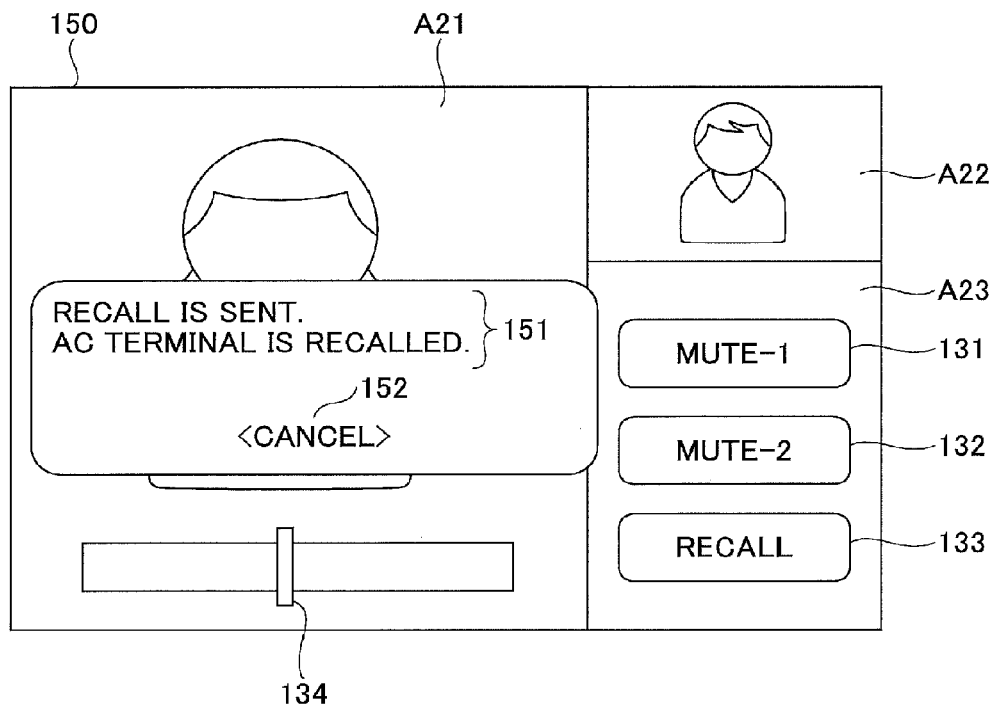
FIGS. 14A, 14B and 14C are diagrams showing examples of recall response screens displayed on a display of the transmission terminal.

FIG. 14A is a diagram showing an example of a recall in-progress screen 150 displayed on the display 120aa of the terminal 10aa as the recall source terminal. A message 151 indicating that "recall is sent and AC terminal is recalled" and a CANCEL button 152 are displayed in the recall in-progress screen 150. The user of the terminal 10aa may grasp from the message 151 that the terminal 10ac is currently being recalled. The CANCEL button 152 is a button for the user of the terminal 10aa to receive cancellation of the request for the outputting of a recalling sound to the terminal 10ac as the destination terminal.

Referring back to FIG. 12, the case in which the REJECT button 143 is pressed will be described.

S8: When the REJECT button 143 is selected, the transmission/reception unit 11 of the terminal 10ac transmits a rejection response message to the management system 50. The terminal ID ("01aa") of the terminal 10aa as the calling source terminal, the terminal ID ("01ac") of the terminal 10ac as the destination terminal, and a recall rejection response (NG) are included in the rejection response message.

S9: The transmission/reception unit 51 of the management system 50 transmits the rejection response message to the terminal 10aa.

Next, the case in which the ACCEPT button 142 is pressed will be described.

S10: When the ACCEPT button 142 is selected, the voice output unit 15B of the terminal 10ac sets the mute setting state of the mute state storage unit 15B13 to an OFF state. When the mute setting state is already in an OFF state, the terminal 10*ac* does not perform any operation.

S11: The transmission/reception unit 11 of the terminal 10*ac* transmits an acceptance response message to the management system 50. The terminal ID ("01*aa*") of the terminal 10*aa* as the calling source terminal, the terminal ID ("01*ac*") of the terminal 10*ac* as the destination terminal, and a recall acceptance response (OK) are included in the acceptance response message.

S12: The transmission/reception unit 51 of the management system 50 transmits the acceptance response message to the terminal 10*aa*.

Next, a common process for the case in which the REJECT button 143 is pressed and the case in which the ACCEPT button 142 is pressed will be described.

S13: The transmission/reception unit 11 of the terminal 10*aa* receives the acceptance response message or the rejection response message from the management system 50. Hence, the display control unit 16 of the terminal 10*aa* updates the recall in-progress screen 150 shown in FIG. 14A and displays a recall response screen.

Figure 14B:
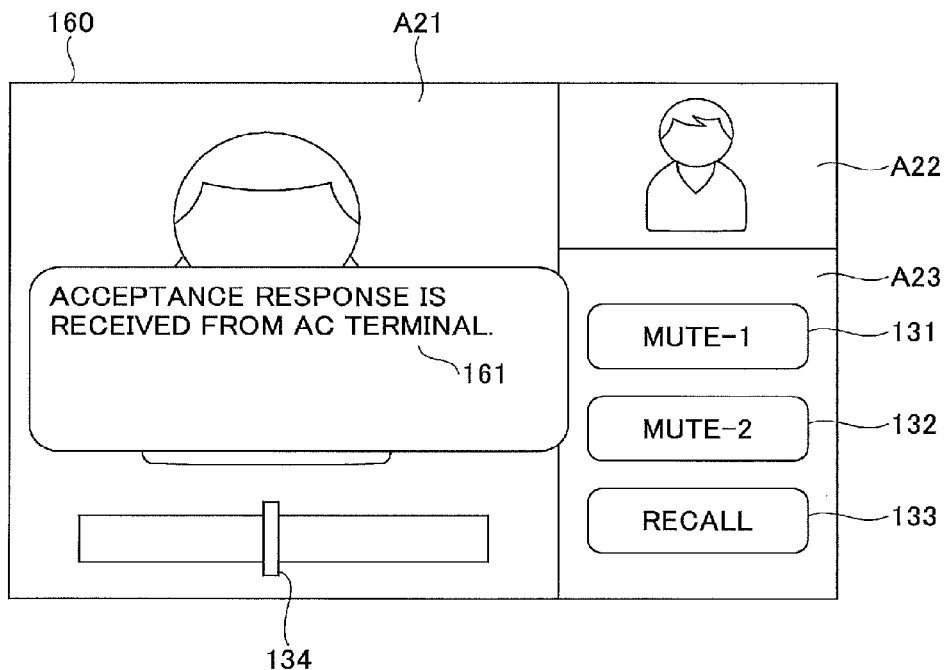
Figure 14C:
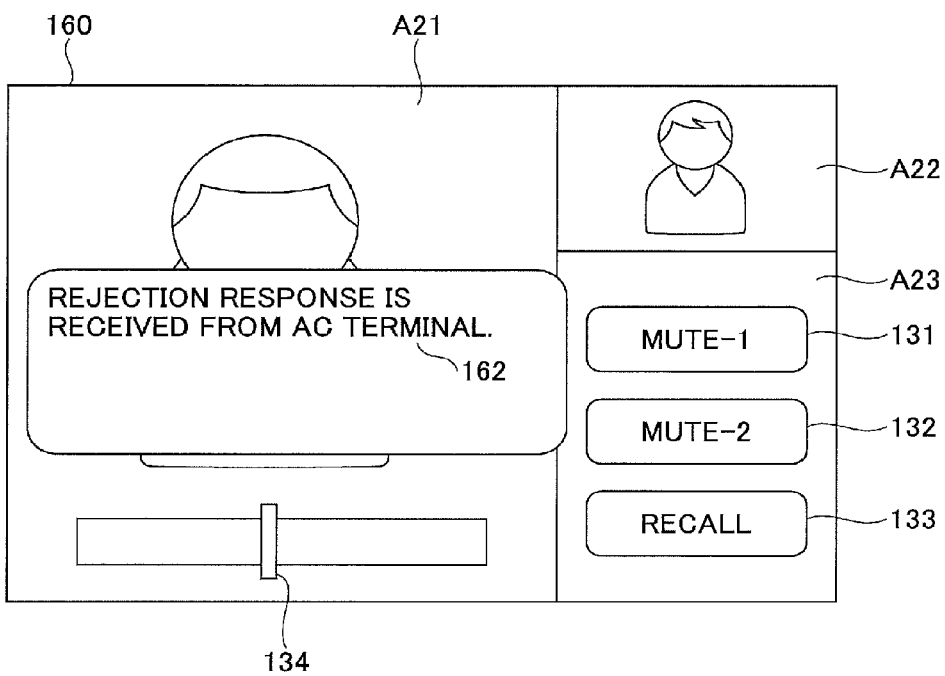

FIG. 14B and FIG. 14C are diagrams showing examples of recall response screens. Specifically, FIG. 14B shows a recall response screen 160 when an acceptance response is transmitted. A message 161 indicating that "acceptance response is received from AC terminal" is displayed in the recall response screen 160. FIG. 14C shows a recall response screen 160 when a rejection response is transmitted. A message 162 indicating that "rejection response is received from AC terminal" is displayed in the recall response screen 160.

From these messages 161 and 162, the user of the terminal 10*aa* may grasp that there is a response from the terminal 10*ac* in which the recalling sound is output. Hence, the user of the terminal 10*aa* may easily detect whether the recall request is accepted or rejected by the user of the terminal 10*ac*.

When the terminal 10*aa* receives the acceptance response, the mute setting state of the terminal 10*ac* is in an OFF state, and the user of the terminal 10*aa* may start a conversation with the user of the terminal 10*ac*.

Note that when a predetermined time interval has elapsed after the reception of the acceptance response or the rejection response, the display control unit 16 of the terminal 10*aa* eliminates the recall response screen 160 and switches to the mode of displaying the conference screen 130 indicating the image data during the videoconference.

[In Case of Mute-2 ON]

As described above, when the mute setting state is set to a mute-2 ON state, the terminal 10*ac* neither outputs the recalling sound nor displays the recall notification screen 140 (alternatively, in this case, the recall notification screen 140 may be displayed according to the user's setting). For this reason, there is a possibility that the user of the terminal 10*ac* forgets the setting of the mute-2 ON state and is unaware of the request for starting a conversation from the user of the terminal 10*aa*.

It is preferred that the transmission system 1 of this embodiment is configured so that, when the mute setting state of the terminal 10*ac* is set to a mute-2 ON state, the terminal 10*ac* sends to the user of the terminal 10*ac* a notification that the mute setting state has been set to the mute-2 ON state.

FIG. 15 is a flowchart for explaining a process in which a notification of the mute setting state having been set to a mute-2 ON state is sent to the user of the terminal 10*ac*. In the process of FIG. 15, steps S10 and S20 are the same as corresponding steps in the process of FIG. 9, and a description thereof will be omitted.

In the process of FIG. 15, after the steps S10-S20 are performed, the mute setting state is stored in the mute state storage unit 15B13. The voice output unit 15B determines whether the mute setting state is the mute-2 ON state (S30). When it is determined that the mute setting state is not the mute-2 ON state (NO of step S30), the outputting of a recalling sound is allowed, and therefore the process of FIG. 15 is terminated.

When it is determined that the mute setting state is the mute-2 ON state (YES of step S30), the recall control unit 15C determines whether a predetermined time interval has elapsed after the setting of the mute-2 ON state (S40). When the predetermined time interval has not elapsed, the recall control unit 15C is in a standby state until the predetermined time interval has elapsed.

When the predetermined time interval has elapsed (YES of S40), the recall control unit 15C requests the display control unit 16 to display a mute notification screen and the display control unit 16 displays the mute notification screen on the display 120*ac* (S50).

Figure 16:
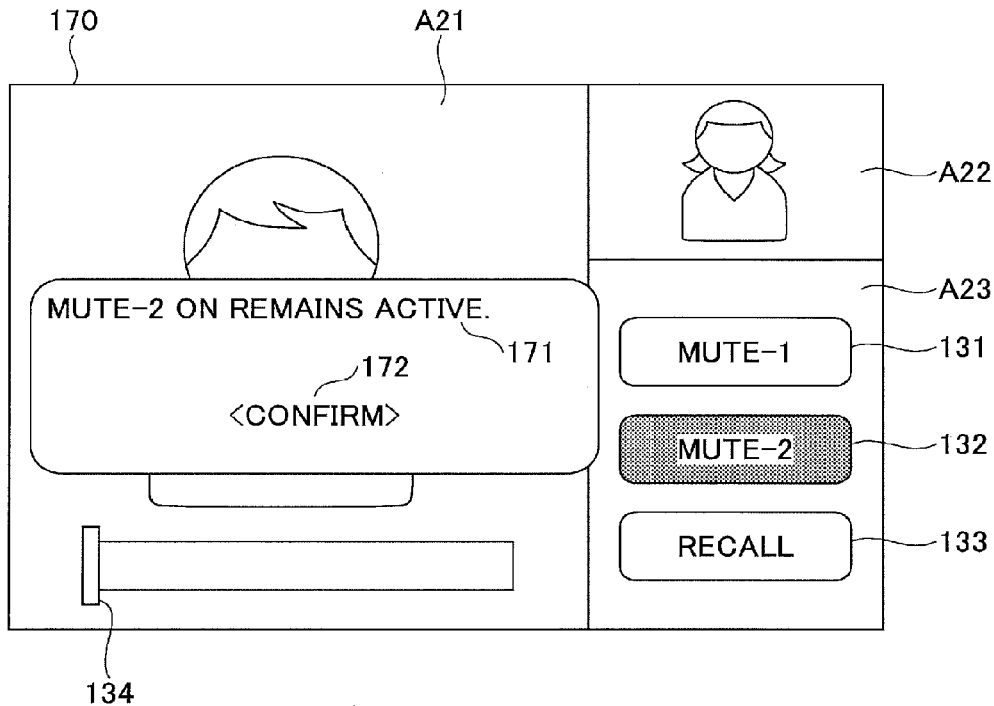
FIG. 16 is a diagram showing an example of a mute notification screen.

FIG. 16 is a diagram showing an example of a mute notification screen 170. A message 171 indicating that "mute-2 ON state remains active", and a CONFIRM button 172 are displayed in the mute notification screen 170. The CONFIRM button 172 is a button for the user of the terminal 10*ac* to confirm the contents of the message 171 in the mute notification screen 170, which is received by the operation input reception unit 12. Namely, when the CONFIRM button 172 is pressed, the operation input reception unit 12 detects that the user has checked the message 171.

Referring back to FIG. 15, the operation input reception unit 12 determines whether the CONFIRM button 172 is pressed (S60). Namely, when the CONFIRM button 172 is not operated over a predetermined time interval after the mute notification screen 170 is displayed, the recall control unit 15C determines that the CONFIRM button 172 is not pressed.

When the CONFIRM button 172 is pressed (YES of S60), the process is returned to step S40. In this case, the mute notification screen 170 is eliminated. When the user's confirmation that the mute-2 ON state remains active is not received, the mute-2 ON state of the terminal 10*ac* may be maintained. Hence, the recall control unit 15C may display the mute notification screen 170 again after the predetermined time interval has elapsed. For example, the display of the mute notification screen 170 may be restricted to once per day.

When the CONFIRM button 172 is not pressed (NO of S60), the recall control unit 15C sets the mute setting state to a mute-1 ON state (S70). When the user's confirmation that the mute-2 ON state remains active is not received, there is a possibility that the user has left the terminal 10*ac* with the mute-2 ON state remaining active or the like, and therefore the mute setting state of the terminal 10*ac* may be switched to the mute-1 ON state and the recalling sound may be output. Namely, if the user of the terminal 10*aa* presses the recall button 133 in this case, the terminal 10*ac* may be controlled to output the recalling sound.

[Transmitting Recall Message to Plural Locations]

There may be cases in which a content data session is established among three or more terminals 10 or mobile terminals 20. For example, a case in which a content data session is established among the terminal 10*aa*, the terminal 10*ac*, and the terminal 10*ab* will be described.

In this case, it would be convenient if the user of the terminal 10aa is able to select one of the terminals of the other-end locations (the terminal 10ac and the terminal 10ab) and request the selected terminal to output a recalling sound.

Figure 17:
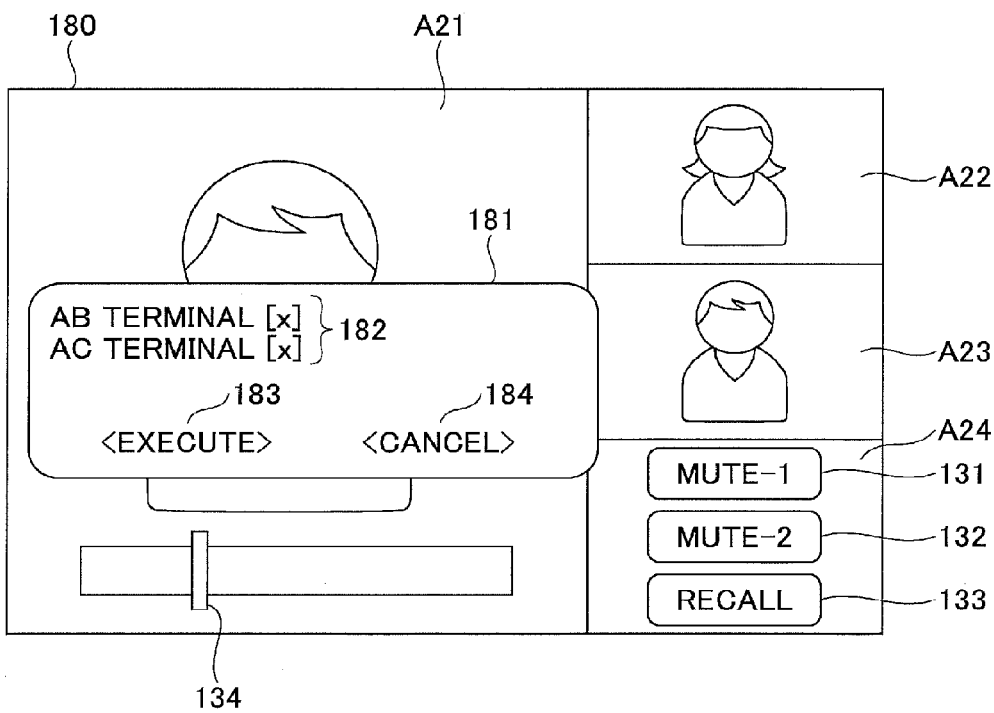
FIG. 17 is a diagram showing an example of a recall terminal selection screen.

FIG. 17 is a diagram showing an example of a recall terminal selection screen 180. In the recall terminal selection screen 180 of FIG. 17, an image of the terminal 10ac is displayed in the viewing area A21, an image of the terminal 10ab is displayed in the viewing area A22, and an image of the terminal 10aa of its own location is displayed in the viewing area A23. For example, if the user of the terminal 10aa presses the recall button 133 in the screen 180, box 181, a check box 182 labelled as "AB TERMINAL" representing the terminal 10ab, and a check box 182 labelled as "AC TERMINAL" representing the terminal 10ac are included. Further, an EXECUTE button 183 and a CANCEL button 184 are displayed in the selection box 181.

By setting a check mark to the desired check box 182 using the operation buttons 108, the user of the terminal 10aa may select one of the terminals 10 for which the recall process is to be performed. The recall process is performed by selecting the EXECUTE button 183 after the selection of the terminal 10. The CANCEL button 184 is a button for the user of the terminal 10aa to eliminate the selection box 181 without performing the recall process.

Note that all the terminals 10 for which the session is established are displayed in the selection box 181, regardless of whether the mute states of the terminals are ON or OFF. For example, viewing the images of the terminals in the recall terminal selection screen 180, the user of the terminal 10aa may select the terminal of which the user has left his seat.

When the management system 50 is configured to manage the terminals 10 in the mute states (the mute-1 ON state and the mute-2 ON state), the terminal 10aa may receive a notification of the mute setting states of the terminals 10 being set to the mute-1 ON state from the management system 50. In this case, the terminal 10aa displays the selection box 181 including only the terminals 10 whose mute setting states are set to the mute-1 ON state. Hence, the user of the terminal 10aa may select all the terminals 10 in the selection box 181 so that a recall message may be transmitted to each of the terminals 10 whose mute setting states are set to the mute-1 ON state.

Figure 18:
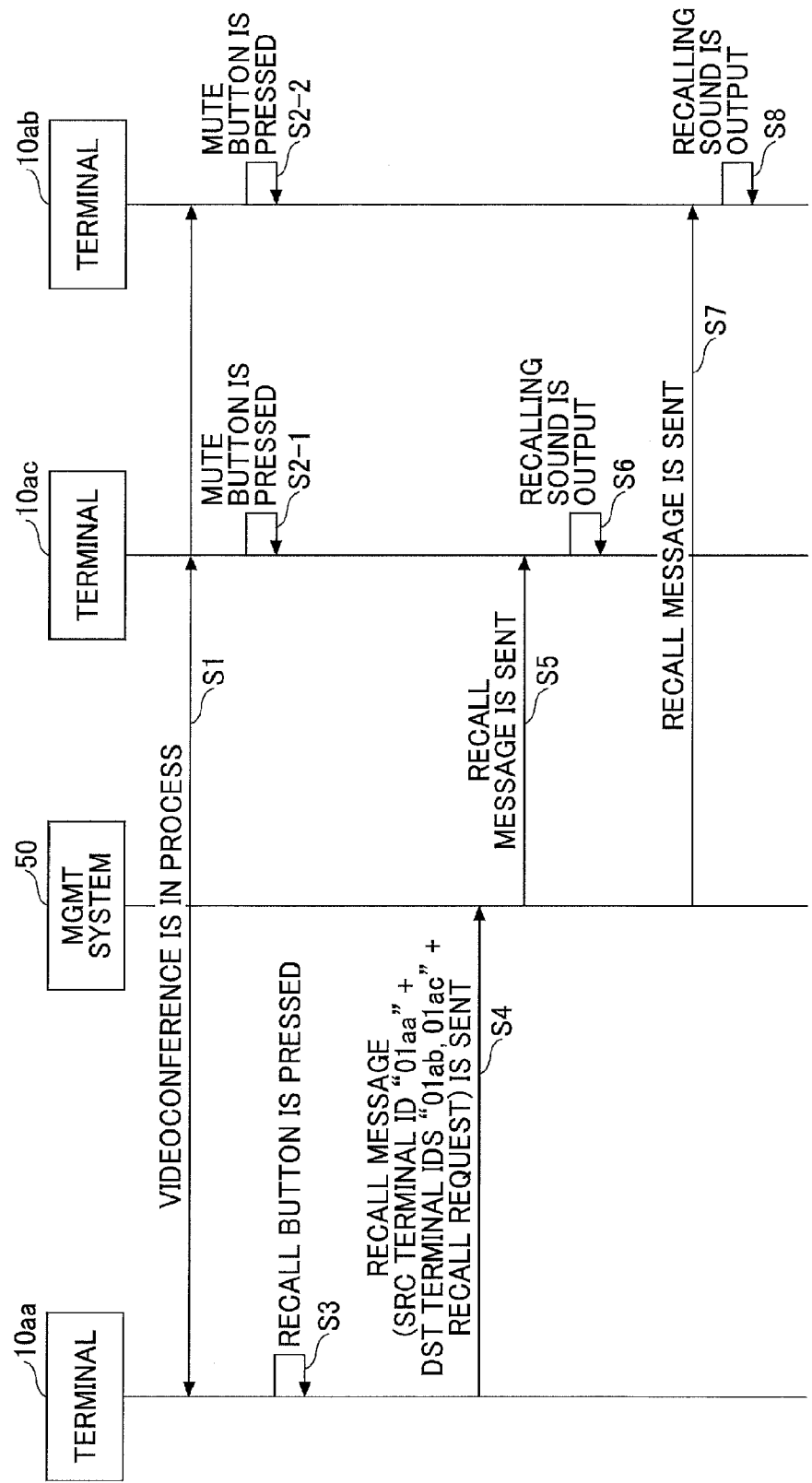
FIG. 18 is a sequence diagram for explaining a process in which the transmission terminal recalls another transmission terminal.

FIG. 18 is a sequence diagram for explaining a process in which the terminal 10aa recalls the terminal 10ac. In the process of FIG. 18, steps S1-S6 are the same as corresponding steps in the process of FIG. 10, and a description thereof will be omitted.

In the process of FIG. 18, after the steps S1-S6 are performed, the terminal 10ac outputs a recalling sound. Note that the recall message sent from the terminal 10aa to the management system 50 at the step S4 includes the terminal ID ("01aa") of the calling source terminal, the terminal IDs ("01ac", "01ab") of the destination terminals, and the recalling request.

S7: The management system 50 transmits the recall message to the terminal 10ab.

S8: The transmission/reception unit 11 of the terminal 10ab receives the recall message from the management system 50, and the recall control unit 15C of the terminal 10ab outputs a recalling sound. The process of outputting the recalling sound at the step S8 is the same as the process of FIG. 11, and a description thereof will be omitted.

According to the process shown in FIG. 18, even when there are two or more terminals 10 of the other-end locations for which the user of the terminal 10aa desire to perform the recall process, the user of the terminal 10aa may perform the recall process by a single operation.

Note that even when a recall message is transmitted to two or more terminals 10, the terminal 10aa may receive acceptance responses or rejection responses from the terminals 10. In this case, the recall in-progress screen 150 including the terminal names of all the terminals 10 to which the recall message is transmitted is displayed, and the recall response screen 160 including the terminal names of all the terminals 10 from which the acceptance responses or the rejection responses are received is displayed. Note that when the acceptance responses or the rejection responses are received from all the terminals 10, the recall response screen 160 is eliminated and switched to the conference screen 130 again.

[Second Embodiment]

In this embodiment, the transmission system 1 is configured so that the user of the terminal 10 of its own location may select one of the terminal images received from the terminals 10 of the other-end locations for which the session is established, and may request the selected terminal to output a recalling sound.

In this embodiment, the elements and functions of the transmission system 1 are the same as the corresponding elements and functions of the transmission system 1 of the first embodiment, and a description thereof will be omitted.

In the first embodiment, when a content data session is established between two terminals 10 at two locations, the user of the terminal 10 of its own location is able to recall the terminal 10 of the other-end location by pressing the recall button 133. When a content data session is established among the terminals 10 at three or more locations, the user of the terminal 10aa who desires to perform the recall process is able to select one or more terminals 10 (or mobile terminals 20) from the recall terminal selection screen 180 shown in FIG. 17.

Figure 19:
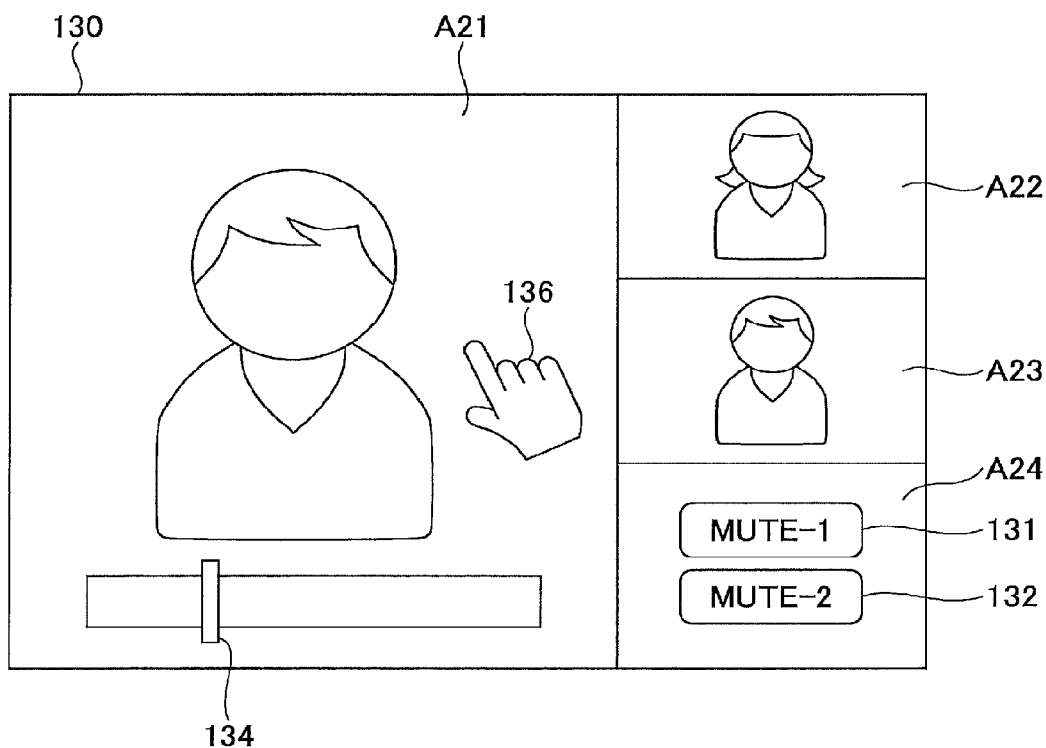
FIG. 19 is a diagram showing an example of a conference screen.

On the other hand, in this embodiment, the user of the terminal 10aa selects other terminals 10 (or mobile terminals 20) to be recalled from a conference screen 130 shown in FIG. 19. The conference screen 130 is displayed on the display 120 of the terminal 10aa after the establishment of the session.

FIG. 19 is a diagram showing an example of a conference screen 130. The user of the terminal 10aa selects the terminals 10 of the other-end locations by using a touch panel, a mouse, etc. For example, a viewing area in which an image of the terminal 10 based on the image data received from the terminal 10 of the other-end location is displayed among viewing areas of the conference screen 130 is pressed with a finger icon 136. Hence, the user of the terminal 10aa is able to recall the other terminal 10 only by pressing the viewing area. Moreover, the user of the terminal 10aa is able to continuously recall the other terminal 10 during the selection of the viewing area, and is able to cancel the recall by canceling the selection of the viewing area.

Figure 20:
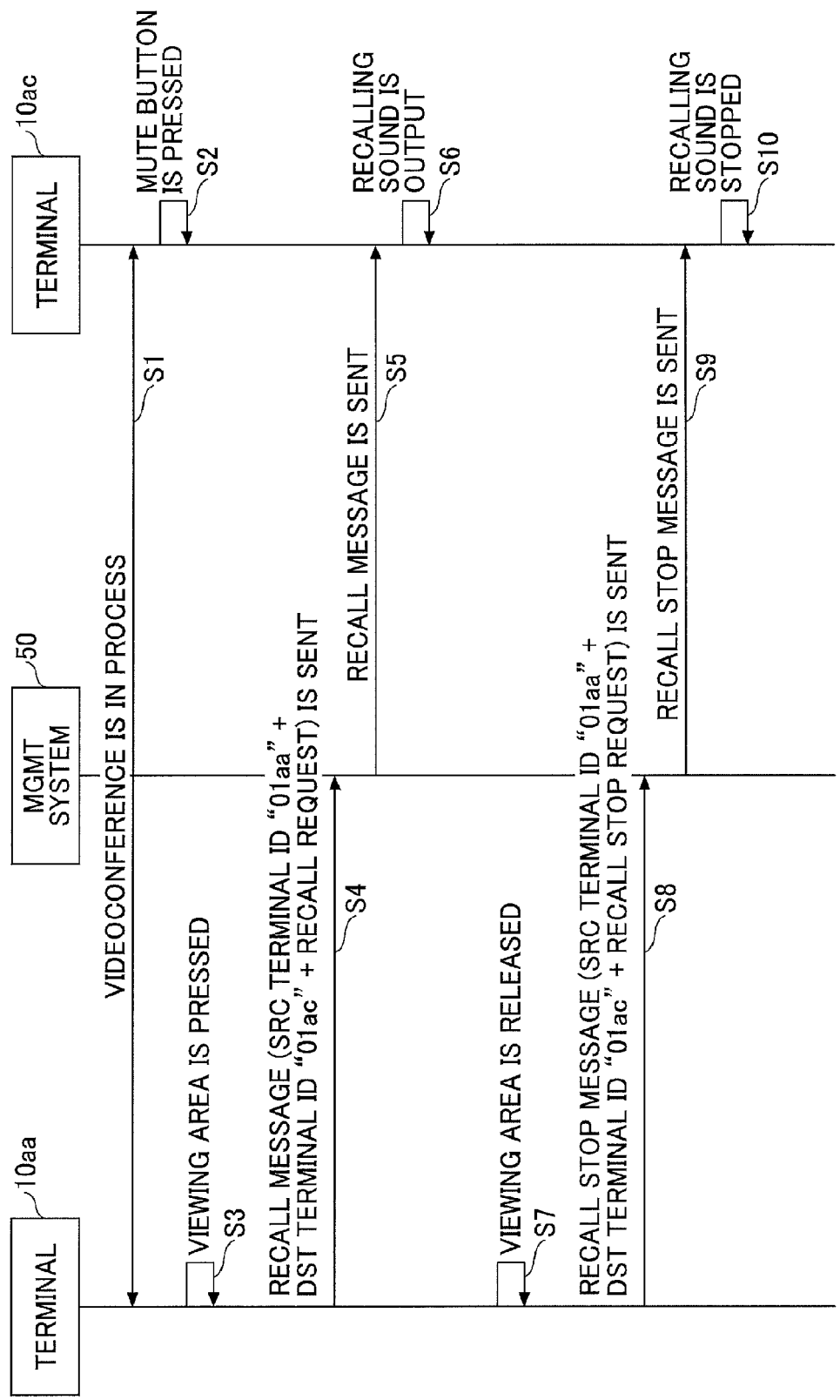
FIG. 20 is a sequence diagram for explaining a process in which the transmission terminal recalls another transmission terminal which is selected by a user.

FIG. 20 is a sequence diagram for explaining a process in which the user of the terminal 10aa recalls the terminal 10ac which is selected with the finger icon 136.

S1: A videoconference between the terminal 10aa and the terminal 10ac is in process. Namely, the terminals 10aa and 10ac are in a state where a content data session is established therebetween, and content data including image data and voice data are transmitted and received between the terminals 10aa and 10ac.

S2: The user of the terminal 10ac presses the mute-1 button 131 and the terminal 10ac is set to a mute-1 ON state.

S3: The user of the terminal 10*aa* presses the viewing area to select the terminal 10*ac*.

S4: If a viewing area is selected by the user of the terminal 10*aa*, the operation input reception unit 12 of the terminal 10*aa* receives position information of the viewing area and sends a notification of the position information of the selected viewing area to the display control unit 16. The display control unit 16 determines a terminal ID ("01*ac*") of the terminal 10*ac* displayed in the selected viewing area by making reference to a table in which the viewing area and the terminal ID are associated or the like. Thereby, the recall control unit 15C transmits to the management system 50 a recall message which is addressed to the terminal 10*ac*.

Note that the recall message may include a terminal ID ("01*aa*") of the calling source terminal, a terminal ID ("01*ac*") of the destination terminal, and a recalling request, and that while the user is selecting a viewing area, the recall control unit 15C continuously transmits a recall message.

S5: The transmission/reception unit 51 of the management system 50 receives the recall message from the terminal 10*aa* and the transmission/reception unit 51 of the management system 50 transmits the recall message to the terminal 10*ac*.

S6: The transmission/reception unit 11 of the terminal 10*ac* receives the recall message from the management system 50, and the recall control unit 15C of the terminal 10*ac* outputs a recalling sound. Similar to the step S66 of the process of FIG. 11, the step 6 in the present embodiment is performed and the output of the recalling sound is continued.

S7: When the user releases the finger icon from the viewing area, the operation input reception unit 12 receives the releasing operation of the finger icon, and sends to the recall control unit 15C a notification that the selection of the viewing area is canceled. The recall control unit 15C transmits to the management system 50 a recall stop message which is addressed to the terminal 10*ac*.

Note that the recall stop message may include a terminal ID ("01*aa*") of the calling source terminal, a terminal ID ("01*ac*") of the destination terminal, and a recall stop request.

S8: The transmission/reception unit 51 of the management system 50 receives the recall stop message from the terminal 10*aa*, and the transmission/reception unit 51 of the management system 50 transmits the recall stop message to the terminal 10*ac*.

S9: The transmission/reception unit 11 of the terminal 10*ac* receives the recall stop message from the management system 50, and the recall control unit 15C of the terminal 10*ac* stops the output of the recalling sound. Namely, the steps S67-S69 of the process of FIG. 11 are performed, and the outputting of the recalling sound is finished.

Hence, the user of the terminal 10*aa* is able to recall the terminal 10*ac* by performing a simple operation of selecting the image data (the viewing area).

Figure 21:
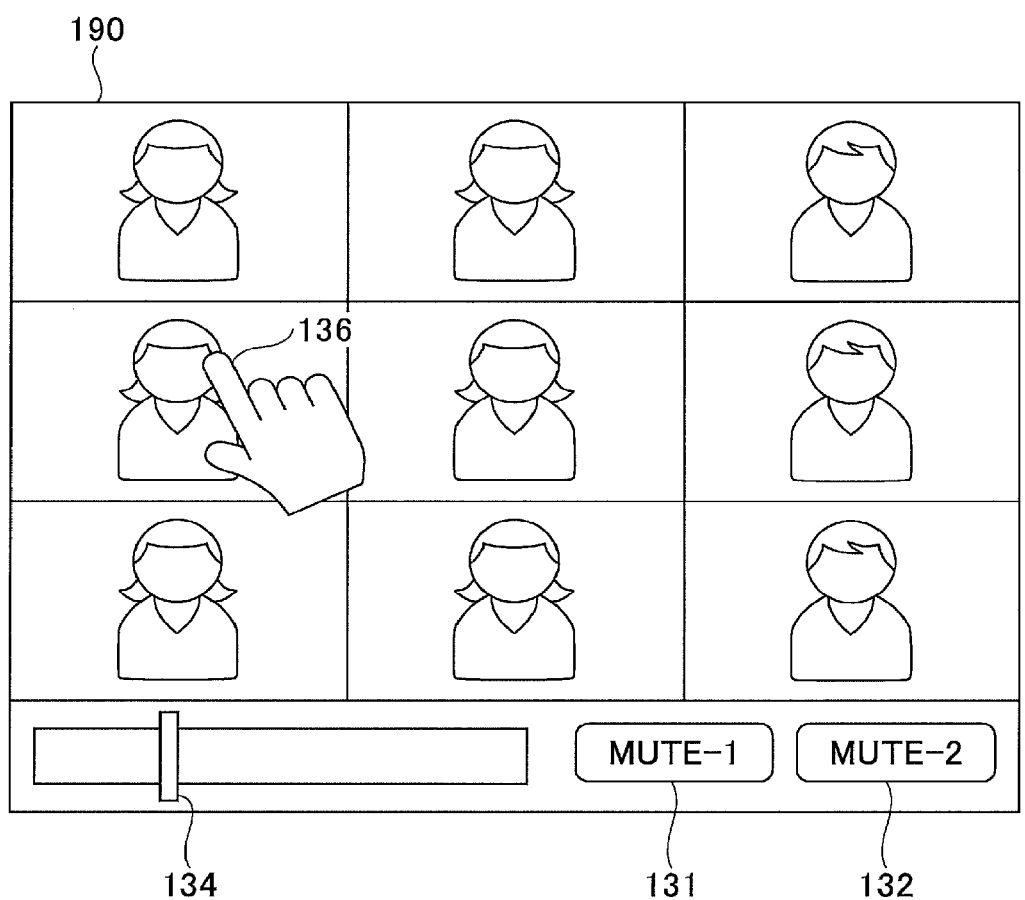
FIG. 21 is a diagram showing an example of a multiple-user conference screen.

Note that, when there are the terminals 10 at many locations as shown in FIG. 21, the user of the terminal 10*aa* is able to select the terminals 10 of the other-end locations similarly. FIG. 21 is a diagram showing an example of a multiple-user conference screen 190.

As shown in FIG. 21, the multiple-user conference screen 190 is divided into nine viewing areas. When the user of the terminal 10*aa* intends to recall two or more of the terminals 10 of the other-end locations, the user presses two or more viewing areas corresponding to the terminals 10 of the other-end locations in the multiple-user conference screen 190 simultaneously. The terminal 10*aa* performs the recall process for each of the selected terminals 10 according to the process of FIG. 20.

When it is difficult to press all the viewing areas corresponding to the terminals 10 of the other-end locations in the screen 190 at once because of too many viewing areas, the viewing areas may be pressed sequentially. In this case, the finger icon 136 or the mouse of the terminal 10*aa* selects only one viewing area at once, and the terminal 10*aa* may perform the recall process for the selected one of the terminals one after another similar to the case in which a single terminal is selected. The recall control unit 15C of each of the terminals 10 of the other-end locations outputs the recalling sound for a predetermined time interval.

Alternatively, when the user of the terminal 10*aa* selects two or more of the terminals 10 of the other-end locations in the screen 190, the display control unit 16 of the terminal 10*aa* may be configured to highlight the viewing areas corresponding to the selected terminals 10 in the screen 190, and thereafter when the user of the terminal 10*aa* presses the recall button 133 (which is not illustrated in FIG. 21, but the recall button 133 will be displayed if the user selects any of the viewing areas), the recall process may be performed for the selected terminals by parallel processing.

[Third Embodiment]

In the above-described embodiments, the recall process is performed such that the user of the terminal 10*aa* recalls the terminal 10*ac* on the assumption that both an image data session and a establishment of the voice data session is not needed until a videoconference is started, and the voice data session may be established upon start of the recall process. In the transmission system 1 of this type, the image data session and the voice data session are established separately. Moreover, each terminal 10 in the transmission system 1 of this type does not output a sound from the speaker 115 until the voice data session is established.

FIG. 22 is a sequence diagram for explaining a process in which the terminal 10*aa* recalls the terminal 10*ac*.

S1: Only an image data session between the terminal 10*aa* and the terminal 10*ac* is established. Namely, only image data are transmitted and received between the terminal 10*aa* and the terminal 10*ac*.

S2: The user of the terminal 10*aa* presses the recall button 133.

S3: The operation input reception unit 12 of the terminal 10*aa* receives the depression of the recall button 133 and sends a notification of the depression of the recall button 133 to the recall control unit 15C. Hence, the recall control unit 15C transmits a recall message which is addressed to the terminal 10*ac* to the management system 50. Note that the terminal ID ("01*aa*") of the calling source terminal, the terminal ID ("01*ac*") of the destination terminal, and the recalling request are included in the recall message.

S4: The transmission/reception unit 51 of the management system 50 receives the recall message from the terminal 10*aa* and transmits the recall message to the terminal 10*ac*.

S5: The transmission/reception unit 11 of the terminal 10*ac* receives the recall message from the management system 50, and the recall control unit 15C of the terminal 10*ac* outputs a recalling sound. This recalling sound is not voice data transmitted from the terminal 10*aa*, and even when a voice data session is not yet established, the terminal 10*ac* may cause the speaker 115 to output the recalling sound.

S6: The management system 50 establishes a voice data session between the terminals 10*aa* and 10*ac*. The voice data session may be established according to the process of the first embodiment. Note that the management system 50 is configured to check the mute setting state of the terminal 10ac, and only when the mute setting state of the terminal 10ac is not the mute-2 ON state, the management system 50 establishes the voice data session.

S7: Thereby, the voice data session is established between the terminals 10aa and 10ac, and voice data may be transmitted and received between the terminals 10aa and 10ac.

Therefore, in the transmission system 1 of this embodiment in which the image data session and the voice data session are established separately, the image of the terminal 10ac of the other-end location may be displayed on the terminal 10aa and the user of the terminal 10ac of the other-end location does not set the terminal 10ac in a mute state. When the user of the terminal 10aa recalls the terminal 10ac, the voice data session is promptly established so that a videoconference between the terminals 10aa and 10ac may be started.

As described in the foregoing, it is possible to provide an information processing apparatus which is capable of recalling another information processing apparatus when communication between the information processing apparatuses is in process.

The information processing apparatus according to the present invention is not limited to the above-described embodiments, and variations and modifications may be made without departing from the scope of the present invention.

For example, only one management system 50 is included in the transmission system 1 as shown in FIG. 1 and FIG. 5. However, two or more management systems 50 may be included in the transmission system 1. Moreover, the functions of the management system 50 may be distributed and incorporated in two or more servers in the transmission system 1.

Moreover, it is not necessarily required that the management system 50 includes the terminal management database 5001, the session management database 5002, and the destination list management database 5003. It is sufficient that the terminal management database 5001, the session management database 5002, and the destination list management database 5003 exist in the communication network 2.

In the above-described embodiments, a recall message is transmitted via the management system 50. Alternatively, the terminal 10 may transmit a recall message directly to another terminal without passing through the management system 50.

The present application is based upon and claims the benefit of priority of Japanese Patent Application No. 2014-221760, filed on Oct. 30, 2014, the contents of which are incorporated herein by reference in their entirety.

What is claimed is:

1. An information processing apparatus, comprising: processing circuitry configured to
receive image data from a second information processing apparatus;
receive a call request from the second information processing apparatus when the processing circuitry is in a state of receiving at least the image data from the second information processing apparatus;
mute a sound of voice data received by the processing circuitry from the second information processing apparatus;
output a calling sound upon reception of the call request irrespective of whether the sound of the voice data is muted;
receive, when the calling sound is output, one of an acceptance response or a rejection response with respect to the call request;
transmit, when the calling sound is output, the received one of the acceptance response or the rejection response to the second information processing apparatus; and
unmute the sound of the voice data when an acceptance response is transmitted to the second information processing apparatus.

2. The information processing apparatus according to claim 1, wherein the processing circuitry is further configured to
store a calling sound volume different from a volume of the voice data received from the second information processing apparatus; and
output the calling sound according to the calling sound volume.

3. The information processing apparatus according to claim 1, wherein the processing circuitry is further configured to
receive a setting indicating whether to allow the output of the calling sound when the sound of the voice data is muted.

4. The information processing apparatus according to claim 3, wherein when the setting, indicating that the output of the calling sound is not allowed, is displayed and a user confirmation is not detected, the circuitry is configured to change the setting to indicate that the output of the calling sound is allowed when the sound of the voice data is muted.

5. A calling method performed by an information processing apparatus comprising comprising processing circuitry configured to receive image data from a second information processing apparatus, the calling method comprising:
receiving a call request from the second information processing apparatus when the processing circuitry is in a state of receiving at least the image data from the second information processing apparatus;
muting, by the processing circuitry, a sound of voice data received by the processing circuitry from the second information processing apparatus;
outputting, by the processing circuitry, a calling sound upon reception of the call request irrespective of whether the sound of the voice data is muted;
receiving, by the processing circuitry when the calling sound is output, one of an acceptance response or a rejection response with respect to the call request;
transmitting, by the processing circuitry when the calling sound is output, the received one of the acceptance response or the rejection response to the second information processing apparatus; and
unmuting, by the processing circuitry, the sound of the voice data when an acceptance response is transmitted to the second information processing apparatus.

6. The calling method according to claim 5, further comprising:
storing a calling sound volume different from a volume of the voice data received from the second information processing apparatus; and
outputting the calling sound according to the calling sound volume.

7. The calling method according to claim 5, further comprising:

receiving a setting indicating whether to allow the output of the calling sound when the sound of the voice data is muted.

8. The calling method according to claim 7, further comprising when the setting, indicating that the output of the calling sound is not allowed, is displayed and a user confirmation is not detected, changing the setting to indicate that the output of the calling sound is allowed when the sound of the voice data is muted.

9. A communication system, comprising:
a first information processing apparatus including first processing circuitry configured to transmit image data; and
a second information processing apparatus including second processing circuitry configured to receive the image data from the first information processing apparatus, wherein
the second processing circuitry is configured to
receive a call request from the first information processing apparatus when the second processing circuitry is in a state of receiving at least the image data from the first information processing apparatus;
output a calling sound upon reception of the call request irrespective of whether the sound of the voice data is muted;
receive, when the calling sound is output, one of an acceptance response or a rejection response with respect to the call request;
transmit, when the calling sound is output, the received one of the acceptance response or the rejection response to the first information processing apparatus; and
unmute the sound of the voice data when an acceptance response is transmitted to the first information processing apparatus, and
the first processing circuitry is configured to
display second image data transmitted by the second information processing apparatus;
receive a selection of the displayed second image data; and
transmit the call request, by setting the first information processing apparatus corresponding to the received selection, to a the second information processing apparatus.

* * * * *